(12) United States Patent
Chong et al.

(10) Patent No.: US 9,807,403 B2
(45) Date of Patent: Oct. 31, 2017

(54) ADAPTIVE LOOP FILTERING FOR CHROMA COMPONENTS

(71) Applicant: Qualcomm Incorporated, San Diego, CA (US)

(72) Inventors: In Suk Chong, San Diego, CA (US); Xianglin Wang, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1186 days.

(21) Appl. No.: 13/653,950

(22) Filed: Oct. 17, 2012

(65) Prior Publication Data

US 2013/0101018 A1    Apr. 25, 2013

Related U.S. Application Data

(60) Provisional application No. 61/550,259, filed on Oct. 21, 2011.

(51) Int. Cl.
*H04N 7/26* (2006.01)
*H04N 19/196* (2014.01)
(Continued)

(52) U.S. Cl.
CPC ......... *H04N 19/196* (2014.11); *H04N 19/117* (2014.11); *H04N 19/14* (2014.11);
(Continued)

(58) Field of Classification Search
CPC .... H04N 19/117; H04N 19/14; H04N 19/186; H04N 19/196; H04N 19/463; H04N 19/82
(Continued)

(56) References Cited

U.S. PATENT DOCUMENTS

2005/0068934 A1    3/2005  Sakoda
2005/0276486 A1*  12/2005  Withers ............... H04N 19/50
                                                  382/232
(Continued)

FOREIGN PATENT DOCUMENTS

CN    101076124 A    11/2007
CN    102057680 A     5/2011
(Continued)

OTHER PUBLICATIONS

Byeungwoo "HEVC: Review on CE8, CE9, CE10" 6th JCT-VC Meeting, Torino, Jul. 2010 (Article Published online on Jul. 29, 2011, Sangyunkwan University).*

(Continued)

*Primary Examiner* — William C Vaughn, Jr.
*Assistant Examiner* — Naod Belai

(57) ABSTRACT

This disclosure proposes techniques to allow more flexibility in filtering chroma components in the adaptive loop filter. In one example, a method for adaptive loop filtering includes performing luma adaptive loop filtering based for luma components of a block of pixels, and performing chroma adaptive loop filtering for chroma components of the block of pixels, wherein filter coefficients for both the luma adaptive loop filtering and chroma adaptive loop filtering are derived from a block-based mode or a region-based mode. The method may further include determining to perform luma adaptive loop filtering on the block of pixels, and determining to perform chroma adaptive loop filtering on the block of pixels, wherein the determining to perform chroma adaptive loop filtering is performed independently of determining to perform luma adaptive loop filtering.

46 Claims, 9 Drawing Sheets

(51) Int. Cl.

| | |
|---|---|
| H04N 19/117 | (2014.01) |
| H04N 19/463 | (2014.01) |
| H04N 19/14 | (2014.01) |
| H04N 19/186 | (2014.01) |
| H04N 19/82 | (2014.01) |

(52) U.S. Cl.
CPC ......... *H04N 19/186* (2014.11); *H04N 19/463* (2014.11); *H04N 19/82* (2014.11)

(58) Field of Classification Search
USPC ...................................................... 375/240.2
See application file for complete search history.

(56) References Cited

U.S. PATENT DOCUMENTS

| | | | |
|---|---|---|---|
| 2009/0129465 A1* | 5/2009 | Lai .................. | H04N 19/597 375/240.02 |
| 2011/0090967 A1 | 4/2011 | Chen et al. | |
| 2011/0150080 A1* | 6/2011 | Watanabe ........... | H04N 19/176 375/240.03 |
| 2011/0243249 A1 | 10/2011 | Lee et al. | |
| 2011/0274158 A1* | 11/2011 | Fu ................... | H04N 19/00006 375/240.02 |
| 2012/0027083 A1 | 2/2012 | Narroschke et al. | |
| 2012/0033040 A1 | 2/2012 | Pahalawatta et al. | |
| 2012/0039383 A1 | 2/2012 | Huang et al. | |
| 2012/0082244 A1 | 4/2012 | Chen et al. | |
| 2012/0183064 A1 | 7/2012 | Liu et al. | |
| 2013/0113880 A1 | 5/2013 | Zhao et al. | |
| 2014/0355695 A1* | 12/2014 | Lim ................... | H04N 19/86 375/240.29 |

FOREIGN PATENT DOCUMENTS

| | | |
|---|---|---|
| WO | 2010001999 A1 | 1/2010 |
| WO | 2010076856 A1 | 7/2010 |
| WO | 2010113524 A1 | 10/2010 |
| WO | 2011043797 A2 | 4/2011 |
| WO | 2011127961 A1 | 10/2011 |

OTHER PUBLICATIONS

Chen et al., "CE8 Subtest 2:Adaptation between Block-based and Region-based Filter Selection," Joint Collaborative Team on Video Coding (JCT-VC) of ITU-T SG16 WP3 and ISO/IEC JTC1/SC29/WG11, 5th Meeting:Geneva, CH, Mar. 16-23, 2011, U.S., JCT-VC, JCTVC-E505, 4 pp.
Wiegand et al., "WD1: Working Draft 1 of High-Efficiency Video Coding", JCTVC-C403, 3rd Meeting: Guangzhou, CN, Oct. 7-15, 2010, 137 pp.
Wiegand et al., "WD2: Working Draft 2 of High-Efficiency Video Coding," JCTVC-D503, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011,193 pp.
Bross et al., "WD4: Working Draft 4 of High-Efficiency Video Coding," 6th Meeting: JCTVC-F803_d2, Torino, IT, Jul. 14-22, 2011, 226 pp.
Bross et al., "WD5: Working Draft 5 of High-Efficiency Video Coding," 7th Meeting: Geneva, Switzerland, Nov. 2011, JCTVC-G1103_d2, 214 pp.
Chong et al., "CE8 Subtest 2: Adaptation between Block-based and REgion-based Filter Selection," JCTVC-E505, 5th Meeting: Geneva, CH, Mar. 16-23, 2011, 4 pp.
Chujoh et al., "Block-based adaptive loop filter," VCEG Meeting; MPEG Meeting, Berlin; Video Coding Experts Group of ITU-T SG.16, Jul. 16, 2008, 20 pp.
International Search Report and Written Opinion—PCT/US2012/060814—ISA/EPO—Jan. 15, 2013, 16 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
Maani et al., "Parametric Adaptive Loop Filter," Document JCTVC-E320, 5th Meeting: Geneva, CH, Mar. 16-23, 2011, 5 pp.
Bross et al., "High efficiency video coding (HEVC) text specification draft 6," 7th Meeting: Geneva, CH, Nov. 21-30, 2011, JCTVC-H1003, 259 pp.
Bross et al., "High efficiency video coding (HEVC) text specification draft 7," 9th Meeting: Geneva, CH, Apr. 27-May 7, 2012, JCTVC-I1003_d21, 290 pp.
Bross et al., "High efficiency video coding (HEVC) text specification draft 8," 10th Meeting: Stockholm, SE, Jul. 11-20, 2012, JCTVC-J1003_d7, 261 pp.
Yamakage et al., "CE8.1: Block based Adaptive Loop Filter by MediaTek, Qualcomm and Toshiba", Document JCTVC-F321, 6th Meeting, Torino, IT, Jul. 14-22, 2011, 6 pp.
Yamakage et al., "Description of Core Experiment 8 (CE8): Non-deblocking loop filtering," Document JCTVC-F908, 6th Meeting: Torino, IT, Jul. 14-22, 2011, 17 pp.
Bross et al., "High efficiency video coding (HEVC) text specification draft 6," JCTVC-H1003, Joint Collaborative Team on Video Coding (JCT-VC) of ITU-T SG16 WP3 and ISO/IEC JTC1/SC29/WG11, 8th Meeting: San José, CA, USA, Feb. 1-10, 2012, 259 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
Second Written Opinion from International Application No. PCT/US2012/060814, dated Sep. 18, 2013, 7 pp.
International Preliminary Report on Patentability from International Application No. PCT/US2012/060814, dated Feb. 3, 2014, 26 pp.
Bossen, "Common test conditions and software reference configurations," 7th Meeting: Nov. 21-30, 2011, Geneva, CH, Joint Collaborative Team on Video Coding (JCT-VC) of ITU-T SG16 WP3 and ISO/IEC JTC1/SC29/WG11, Jan. 12, 2012; Document: JCTVC-G1200, WG11 No. m22869, 2011, 4 pp.
Chen et al., "CE8 Subset2: A Joint Proposal on Improving the Adaptive Loop Filter in TMuC0.9 by MediaTek, Qualcomm, and Toshiba," JCT-VC Meeting; MPEG Meeting; Jan. 20-28, 2011; Daegu, KR (Joint Collaborative Team on Video Coding of ISO/IECJTC1/SC29/WG11 and ITU-TSG.16); URL: http://wftp3.itu.int/av-arch/jctvc-site/, No. JCTVC-D119, Jan. 15, 2011, 18 pp.
Chen et al., "CE8 Subtest 2:Adaptation between Pixel-based and Region-based Filter Selection," Joint Collaborative Team on Video Coding(JCT-VC) of ITU-T SG16 WP3 and ISO/IEC JTC1/SC29/WG11, 5th Meeting: Geneva, CH, Mar. 16-23, 2011, JCTVC, Mar. 10, 2011, JCTVC-E046, 6 pp.
Chen et al., "Non-CE8.c.7: Single-source SAO and ALF virtual boundary processing with cross9x9," Nov. 21-30, 2011, Joint Collaborative Team on Video Coding (JCT-VC) of ITU-T SG16 WP3 and ISO/IEC JTC1/SC29/WG11, 7th Meeting, Geneva, CH, Nov. 13, 2011, JCTVC-G212, 25 pp.
Chong et al., "CE2.a.1: Signalling mode change from slice header mode to interleaving mode," 9th Meeting: Apr. 27-May 7, 2012, Geneva, CH, Joint Collaborative Team on Video Coding (JCT-VC) of ITU-T SG 16 WP 3 and ISO/IEC JTC 1/SC 29/WG 11, Apr. 16, 2012; Document: JCTVC-I0249, 6 pp.
Fuldseth et al., "ALF with low latency and reduced complexity for HEVC," 6th Meeting: Jul. 14-22, 2011, Torino; IT, Joint Collaborative Team on Video Coding (JCT-VC) of ITU-T SG16 WP3 and ISO/IEC JTC1/SC29/WG11, Document: JCTVC-F542, Jul. 17, 2011, 3 pp.
Fuldseth et al., "CE8.a.2: ALF with LCU-based syntax," JCT-VC Meeting; MPEG Meeting; Feb. 1-10, 2012; San Jose, CA, US (Joint Collaborative Team on Video Coding of ISO/IEC JTC1/SC29/WG11 and ITU-T SG.16 ); URL: http://wftp3.itu.int/av-arch/jctvc-site/, No. JCTVC-H0066, Jan. 20, 2012, XP030111093, 11 pp.
Fuldseth et al., "Improved ALF with low latency and reduced complexity," 7th Meeting, Nov. 21-30, 2011; Geneva, CH (Motion Picture Expert Group or ISO/IEC JTC1/SC29/WG11), Document: JCTVC-G499, No. m22063, Nov. 22, 2011, XP030050626, 7 pp.

(56) References Cited

OTHER PUBLICATIONS

Fuldseth et.al., "CE8: ALF with low latency and reduced complexity for HEVC," Nov. 21-30, 2011; Geneva, CH; [online], Nov. 15, 2011, Joint Collaborative Team on Video Coding (JCT-VC) of ITU-T SG16 WP3 and ISO/IEC JTC1/SC29/WG11, Document: JCTVC-G498 (version 4), 4 pp.

Yamakage et al., "Description of Core Experiment 8 (CE8): Non-deblocking loop filtering," 6th Meeting: Jul. 14-22, 2011, Torino; IT, Joint Collaborative Team on Video Coding (JCT-VC) of ITU-T SG16 WP3 and ISO/IEC JTC1/SC29/WG11, Document: JCTVC-G1208r1, WG11 No. m22849, Nov. 30, 2011, 15 pp.

Chiariglione, "Report of 97th Meeting" International Organisation for Standardisation Organisation Internationale De Normalisation ISO/IEC JTC 1/SC 29/WG 11 Coding of Moving Pictures and Audio ISO/IEC JTC 1/SC 29/WG 11 N12058 Torino, IT, Jul. 2011, 443 pp. [uploaded in parts].

\* cited by examiner

ADAPTIVE LOOP FILTERING FOR CHROMA COMPONENTS

This application claims the benefit of U.S. Provisional Application No. 61/550,259, filed Oct. 21, 2011, the entire content of which is incorporated herein by reference.

TECHNICAL FIELD

This disclosure relates to video coding, and more particularly to techniques for adaptive loop filtering for chroma components in a video coding process.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards, to transmit, receive and store digital video information more efficiently.

Video compression techniques include spatial prediction and/or temporal prediction to reduce or remove redundancy inherent in video sequences. For block-based video coding, a video frame or slice may be partitioned into blocks. Each block can be further partitioned. Blocks in an intra-coded (I) frame or slice are encoded using spatial prediction with respect to reference samples in neighboring blocks in the same frame or slice. Blocks in an inter-coded (P or B) frame or slice may use spatial prediction with respect to reference samples in neighboring blocks in the same frame or slice or temporal prediction with respect to reference samples in other reference frames. Spatial or temporal prediction results in a predictive block for a block to be coded. Residual data represents pixel differences between the original block to be coded and the predictive block.

An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in a particular order to produce a one-dimensional vector of transform coefficients for entropy coding.

SUMMARY

In general, this disclosure describes techniques for coding video data. In particular, this disclosure describes techniques for an adaptive loop filter (ALF) process for video coding. This disclosure proposes techniques to allow more flexibility in filtering chroma components in an ALF process.

In one example of the disclosure, a method for adaptive loop filtering in a video coding process is disclosed. The method includes performing luma adaptive loop filtering based for luma components of a block of pixels, and performing chroma adaptive loop filtering for chroma components of the block of pixels, wherein filter coefficients for both the luma adaptive loop filtering and chroma adaptive loop filtering are derived from a block-based mode or a region-based mode. The chroma components of the block of pixels may be in a 4:2:0, a 4:2:2 or a 4:4:4 pixel format.

In another example of the disclosure, the method may further include determining to perform luma adaptive loop filtering on the block of pixels, and determining to perform chroma adaptive loop filtering on the block of pixels, wherein determining to perform chroma adaptive loop filtering is performed independently of determining to perform luma adaptive loop filtering. Determining to perform chroma adaptive loop filtering may include signaling or receiving a CU level ALF on/off flag.

In another example of the disclosure, filter information for luma adaptive loop filtering is used for chroma adaptive loop filtering. The filter information may include a CU level on/off map, filter coefficients, and/or block-based classification.

In another example of the disclosure, the filter coefficients for chroma adaptive loop filtering are predicted from the filter coefficients for luma adaptive loop filtering.

In another example of the disclosure, performing chroma adaptive loop filtering may include performing Cr chroma adaptive loop filtering for Cr chroma components of the block of pixels and performing Cb chroma adaptive loop filtering for Cb chroma components for the block of pixels. Filter information for Cr chroma adaptive loop filtering may be used for Cb chroma adaptive loop filtering. The filter information includes a CU level on/off map, filter coefficients, and/or block-based classification. In another example of the disclosure, the filter coefficients for Cb chroma adaptive loop filtering are predicted from the filter coefficients for Cr chroma adaptive loop filtering.

The techniques of this disclosure will also be described in terms of apparatuses and devices configured to perform the techniques, as well a computer-readable storage medium that stores instructions that may cause one or processors to perform the techniques.

The details of one or more examples are set forth in the accompanying drawings and the description below. Other features, objects, and advantages will be apparent from the description and drawings, and from the claims.

DETAILED DESCRIPTION

Figure 1:
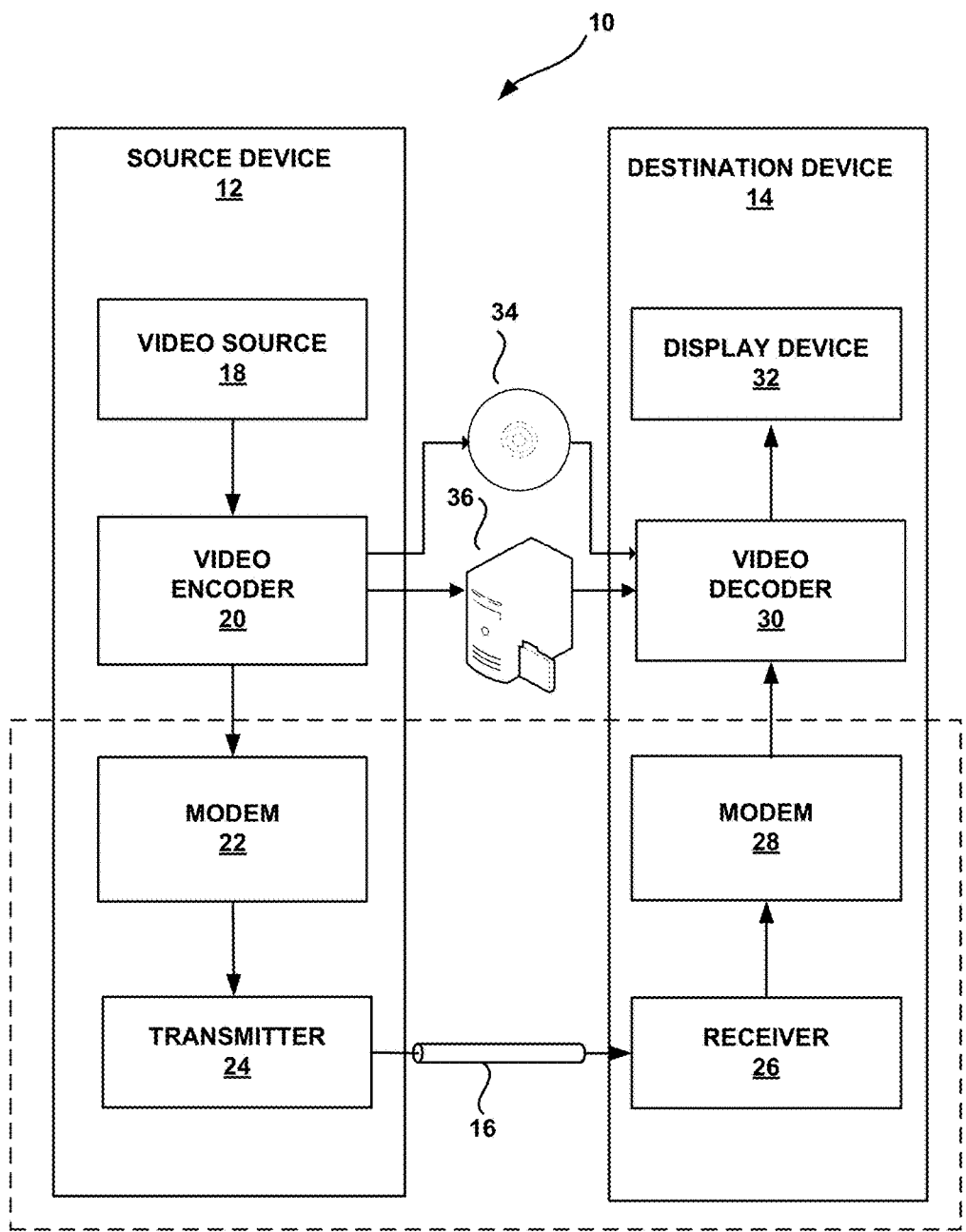
FIG. 1 is a block diagram illustrating an example video encoding and decoding system.

In general, this disclosure describes techniques for coding video data. In particular, this disclosure describes techniques for adaptive loop filtering (ALF) of chroma components in a video coding process.

Previous techniques for applying ALF treated luma and chroma components of pixels differently. In particular, a specific ALF, out of multiple possible ALFs, is chosen for use for luma components based on the local region or activity of the luma components. As such, ALF for luma components is flexible and more tailored to the specific scene of video. On the other, only one ALF is used for chroma components, and its use is dependent on the luma ALF being used. Using only one ALF for chroma components, as well as not applying ALF for chroma components independently of ALF for luma components, may limit the quality of ALF for 4:2:0 pixel sampling formats, also referred to as chroma sampling formats. Accordingly, this disclosure proposes techniques to allow more flexibility in filtering chroma components in the ALF. In other examples, the techniques of this disclosure for ALF of chroma components are not limited to just the 4:2:0 pixel format. The ALF techniques of this disclosure may be applied to chroma components in other pixel formats, such as 4:2:2 and 4:4:4 pixel formats.

Digital video devices implement video compression techniques to encode and decode digital video information more efficiently. Video compression may apply spatial (intra-frame) prediction and/or temporal (inter-frame) prediction techniques to reduce or remove redundancy inherent in video sequences.

There is a new video coding standard, namely High-Efficiency Video Coding (HEVC), being developed by the Joint Collaboration Team on Video Coding (JCT-VC) of ITU-T Video Coding Experts Group (VCEG) and ISO/IEC Motion Picture Experts Group (MPEG). A recent draft of the HEVC standard, referred to as "HEVC Working Draft 8" or "WD8," is described in document JCTVC-J1003, Bross et al., "High efficiency video coding (HEVC) text specification draft 6," Joint Collaborative Team on Video Coding (JCT-VC) of ITU-T SG16 WP3 and ISO/IEC JTC1/SC29/WG11, 10th Meeting: Stockholm, SE, 11-20 Jul. 2012, which, as of Oct. 15, 2012, is downloadable from http://phenix.int-evry.fr/jct/doc_end_user/documents/10_Stockholm/wg11/JCTVC-J1003-v8.zip.

For video coding according to HEVC, as one example, a video frame may be partitioned into coding units. A coding unit (CU) generally refers to an image region that serves as a basic unit to which various coding tools are applied for video compression. A CU usually has a luminance component, which may be denoted as Y, and two chroma components, which may be denoted as Cr and Cb. Depending on the video sampling format, the size of the Cr and Cb components, in terms of number of samples, may be the same as or different from the size of the Y component. A CU is typically square, and may be considered to be similar to a so-called macroblock, e.g., under other video coding standards such as ITU-T H.264.

The luma and chroma components of pixels in a CU may be coded in different sub-sampling formats. In one proposal for HEVC, the luma and chroma components of a pixel are coded in a 4:2:0 format. In a 4:2:0 pixel format, for every 4×2 block of pixels, there are eight luma components (4 in each row) and 2 chroma components (e.g., 1 Cr chroma component and 1 Cb chroma component in the first row of the 4×2 block). The second row of the 4×2 block would have no chroma information. As such, in a 4×2 block of pixels, the chroma components are sampled at ½ horizontal resolution and ½ vertical resolution. However, video coding techniques are not limited to 4:2:0 chroma sub-sampling. Other sub-sampling formats may be used, including 4:2:2 and 4:4:4. In a 4:2:2 pixel format, for every 4×2 block of pixels, there are eight luma components (4 in each row) and 4 chroma components (e.g., 1 Cr chroma component and 1 Cb chroma component in each of the first and second rows of the 4×2 block). As such, for a 4:2:2 format, the chroma components are sampled at ½ horizontal resolution and full vertical resolution. The 4:4:4 pixel format involves no sub-sampling of chroma components. That is, for a 4×2 block of pixels, there are eight luma components, eight Cr components, and eight Cb components.

To achieve better coding efficiency, a coding unit may have variable sizes depending on video content. In addition, a coding unit may be split into smaller blocks for prediction or transform. In particular, each coding unit may be further partitioned into prediction units (PUs) and transform units (TUs). PUs may be considered to be similar to so-called partitions under other video coding standards, such as ITU-T H.264. TUs refer to blocks of residual data to which a transform is applied to produce transform coefficients.

Coding according to some of the presently proposed aspects of the developing HEVC standard will be described in this disclosure for purposes of illustration. However, the techniques described in this disclosure may be useful for other video coding processes, such as those defined according to H.264 or other standard or proprietary video coding processes.

HEVC standardization efforts are based on a model of a video coding device referred to as the HEVC Test Model (HM). The HM presumes several capabilities of video coding devices over devices according to, e.g., ITU-T H.264/AVC. For example, whereas H.264 provides nine intra-prediction encoding modes, HM provides as many as thirty-five intra-prediction encoding modes.

According to the HM, a CU may include one or more prediction units (PUs) and/or one or more transform units (TUs). Syntax data within a bitstream may define a largest coding unit (LCU), which is a largest CU in terms of the number of pixels. In general, a CU has a similar purpose to a macroblock of H.264, except that a CU does not have a size distinction. Thus, a CU may be split into sub-CUs. In general, references in this disclosure to a CU may refer to a largest coding unit of a picture or a sub-CU of an LCU. An LCU may be split into sub-CUs, and each sub-CU may be further split into sub-CUs. Syntax data for a bitstream may define a maximum number of times an LCU may be split, referred to as CU depth. Accordingly, a bitstream may also define a smallest coding unit (SCU). This disclosure also uses the term "block", "partition," or "portion" to refer to any of a CU, PU, or TU. In general, "portion" may refer to any sub-set of a video frame.

An LCU may be associated with a quadtree data structure. In general, a quadtree data structure includes one node per CU, where a root node corresponds to the LCU. If a CU is split into four sub-CUs, the node corresponding to the CU includes four leaf nodes, each of which corresponds to one of the sub-CUs. Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU.

Moreover, TUs of leaf-CUs may also be associated with respective quadtree data structures. That is, a leaf-CU may include a quadtree indicating how the leaf-CU is partitioned into TUs. This disclosure refers to the quadtree indicating how an LCU is partitioned as a CU quadtree and the quadtree indicating how a leaf-CU is partitioned into TUs as a TU quadtree. The root node of a TU quadtree generally corresponds to a leaf-CU, while the root node of a CU quadtree generally corresponds to an LCU. TUs of the TU quadtree that are not split are referred to as leaf-TUs.

A leaf-CU may include one or more prediction units (PUs). In general, a PU represents all or a portion of the corresponding CU, and may include data for retrieving a reference sample for the PU. For example, when the PU is inter-mode encoded, the PU may include data defining a motion vector for the PU. The data defining the motion vector may describe, for example, a horizontal component of the motion vector, a vertical component of the motion vector, a resolution for the motion vector (e.g., one-quarter pixel precision or one-eighth pixel precision), a reference frame to which the motion vector points, and/or a reference list (e.g., list 0 or list 1) for the motion vector. Data for the leaf-CU defining the PU(s) may also describe, for example, partitioning of the CU into one or more PUs. Partitioning modes may differ depending on whether the CU is not predictively coded, intra-prediction mode encoded, or inter-prediction mode encoded. For intra coding, a PU may be treated the same as a leaf transform unit described below.

To code a block (e.g., a prediction unit (PU) of video data), a predictor for the block is first derived. The predictor can be derived either through intra (I) prediction (i.e. spatial prediction) or inter (P or B) prediction (i.e. temporal prediction). Hence, some prediction units may be intra-coded (I) using spatial prediction with respect to neighbouring reference blocks in the same frame, and other prediction units may be inter-coded (P or B) with respect to reference blocks in other frames. The reference blocks used for prediction may include actual pixel values at so-called integer pixel positions as reference samples, or synthesized pixel values produced by interpolation at fractional pixel positions as reference samples.

Upon identification of a predictor, the difference between the original video data block and its predictor is calculated. This difference is also called the prediction residual, and refers to the pixel differences between the pixels of the block to be coded and corresponding reference samples (which may be integer-precision pixels or interpolated fractional-precision pixels, as mentioned above) of the reference block, i.e., predictor. To achieve better compression, the prediction residual (i.e., the array of pixel difference values) is generally transformed from the pixel (i.e., spatial) domain to a transform domain, e.g., using a discrete cosine transform (DCT), integer transform, Karhunen-Loeve (K-L) transform, or other transform. The transform domain may be, for example, a frequency domain.

Coding a PU using inter-prediction involves calculating a motion vector between a current block and a block in a reference frame. Motion vectors are calculated through a process called motion estimation (or motion search). A motion vector, for example, may indicate the displacement of a prediction unit in a current frame relative to a reference sample of a reference frame. A reference sample may be a block that is found to closely match the portion of the CU including the PU being coded in terms of pixel difference, which may be determined by sum of absolute difference (SAD), sum of squared difference (SSD), or other difference metrics. The reference sample may occur anywhere within a reference frame or reference slice. In some examples, the reference sample may be interpolated, in whole or in part, and occur at a fractional pixel position. Upon finding a portion of the reference frame that best matches the current portion, the encoder determines the current motion vector for the current portion as the difference in the location from the current portion to the matching portion in the reference frame (e.g., from the center of the current portion to the center of the matching portion).

In some examples, an encoder may signal the motion vector for each portion in the encoded video bitstream. The signaled motion vector is used by the decoder to perform motion compensation in order to decode the video data.

Once motion estimation is performed to determine a motion vector for a current portion, the encoder compares the matching portion in the reference frame to the current portion. This comparison typically involves subtracting the portion (which is commonly referred to as a "reference sample") in the reference frame from the current portion and results in so-called residual data, as mentioned above. The residual data indicates pixel difference values between the current portion and the reference sample. The encoder then transforms this residual data from the spatial domain to a transform domain, such as the frequency domain. Usually, the encoder applies a discrete cosine transform (DCT) to the residual data to accomplish this transformation. The encoder performs this transformation in order to facilitate the compression of the residual data because the resulting transform coefficients represent different frequencies, wherein the majority of energy is usually concentrated on a few low frequency coefficients.

Typically, the resulting transform coefficients are grouped together in a manner that enables entropy coding, especially if the transform coefficients are first quantized (rounded). The encoder then performs statistical lossless (or so-called "entropy") encoding to further compress the run-length coded quantized transform coefficients. After performing lossless entropy coding, the encoder generates a bitstream that includes the encoded video data.

The video encoding process may also include a so-called "reconstruction loop" whereby encoded video blocks are decoded and stored in a reference frame buffer for use as reference frames for subsequently coded video blocks. The reference frame buffer also is referred to as the decoded picture buffer or DPB. The reconstructed video blocks are often filtered before storing in the reference frame buffer. Filtering is commonly used, for example, to reduce blockiness or other artifacts common to block-based video coding. Filter coefficients (sometimes called filter taps) may be defined or selected in order to promote desirable levels of video block filtering that can reduce blockiness and/or improve the video quality in other ways. A set of filter coefficients, for example, may define how filtering is applied along edges of video blocks or other locations within video blocks. Different filter coefficients may cause different levels of filtering with respect to different pixels of the video blocks. Filtering, for example, may smooth or sharpen differences in intensity of adjacent pixel values in order to help eliminate unwanted artifacts.

As one example, a deblocking filter may be used to improve the appearance (e.g., smooth the edges) between blocks of coded video data. Another example filter is a sample adaptive offset (SAO) filter that is used to add offset to reconstructed blocks of pixels to improve image quality and coding efficiency. Another type of filter that is used in the reconstruction loop in one proposal for HEVC is the adaptive loop filter (ALF). The ALF is typically performed after a deblocking filter. The ALF restores the fidelity of pixels degraded by the video coding compression process. The ALF attempts to minimize the mean squared error between the original pixel values in the source frame and those of the reconstructed frame. An ALF is also applied at the output of a video decoder in the same fashion as was applied during the encoding process. Collectively, any filter used in the reconstruction loop may be referred to as a "loop filter." Loop filters may include one or more deblocking filters, SAO filters, and ALFs. In addition, other types of filters for use in the reconstruction loop are also possible.

This disclosure presents techniques for ALF. In particular, this disclosure presents techniques for ALF of chroma components. In one or more examples of this disclosure, ALF for chroma components may be applied independently of ALF for luma components. In other examples of the disclosure, a specific ALF for chroma components is determined from a group of multiple ALFs through use of block-based or region-based classifications.

FIG. 1 is a block diagram illustrating an example video encoding and decoding system 10 that may be configured to utilize techniques for adaptive loop filtering in a video coding process in accordance with examples of this disclosure. As shown in FIG. 1, the system 10 includes a source device 12 that transmits encoded video to a destination device 14 via a communication channel 16. Encoded video data may also be stored on a storage medium 34 or a file server 36 and may be accessed by the destination device 14 as desired. When stored to a storage medium or file server, video encoder 20 may provide coded video data to another device, such as a network interface, a compact disc (CD), Blu-ray or digital video disc (DVD) burner or stamping facility device, or other devices, for storing the coded video data to the storage medium. Likewise, a device separate from video decoder 30, such as a network interface, CD or DVD reader, or the like, may retrieve coded video data from a storage medium and provided the retrieved data to video decoder 30.

The source device 12 and the destination device 14 may comprise any of a wide variety of devices, including desktop computers, notebook (i.e., laptop) computers, tablet computers, set-top boxes, telephone handsets such as so-called smartphones, televisions, cameras, display devices, digital media players, video gaming consoles, or the like. In many cases, such devices may be equipped for wireless communication. Hence, the communication channel 16 may comprise a wireless channel, a wired channel, or a combination of wireless and wired channels suitable for transmission of encoded video data. Similarly, the file server 36 may be accessed by the destination device 14 through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server.

Techniques for adaptive loop filtering in a video coding process, in accordance with examples of this disclosure, may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, the system 10 may be configured to support one-way or two-way video transmission to support applications such as video streaming, video playback, video broadcasting, and/or video telephony.

In the example of FIG. 1, the source device 12 includes a video source 18, a video encoder 20, a modulator/demodulator 22 and a transmitter 24. In the source device 12, the video source 18 may include a source such as a video capture device, such as a video camera, a video archive containing previously captured video, a video feed interface to receive video from a video content provider, and/or a computer graphics system for generating computer graphics data as the source video, or a combination of such sources. As one example, if the video source 18 is a video camera, the source device 12 and the destination device 14 may form so-called camera phones or video phones. However, the techniques described in this disclosure may be applicable to video coding in general, and may be applied to wireless and/or wired applications, or application in which encoded video data is stored on a local disk.

The captured, pre-captured, or computer-generated video may be encoded by the video encoder 20. The encoded video information may be modulated by the modem 22 according to a communication standard, such as a wireless communication protocol, and transmitted to the destination device 14 via the transmitter 24. The modem 22 may include various mixers, filters, amplifiers or other components designed for signal modulation. The transmitter 24 may include circuits designed for transmitting data, including amplifiers, filters, and one or more antennas.

The captured, pre-captured, or computer-generated video that is encoded by the video encoder 20 may also be stored onto a storage medium 34 or a file server 36 for later consumption. The storage medium 34 may include Blu-ray discs, DVDs, CD-ROMs, flash memory, or any other suitable digital storage media for storing encoded video. The encoded video stored on the storage medium 34 may then be accessed by the destination device 14 for decoding and playback.

The file server 36 may be any type of server capable of storing encoded video and transmitting that encoded video to the destination device 14. Example file servers include a web server (e.g., for a website), an FTP server, network attached storage (NAS) devices, a local disk drive, or any other type of device capable of storing encoded video data and transmitting it to a destination device. The transmission of encoded video data from the file server 36 may be a streaming transmission, a download transmission, or a combination of both. The file server 36 may be accessed by the destination device 14 through any standard data connection, including an Internet connection. This may include a wireless channel (e.g., a Wi-Fi connection), a wired connection (e.g., DSL, cable modem, Ethernet, USB, etc.), or a combination of both that is suitable for accessing encoded video data stored on a file server.

The destination device 14, in the example of FIG. 1, includes a receiver 26, a modem 28, a video decoder 30, and a display device 32. The receiver 26 of the destination device 14 receives information over the channel 16, and the modem 28 demodulates the information to produce a demodulated bitstream for the video decoder 30. The information communicated over the channel 16 may include a variety of syntax information generated by the video encoder 20 for use by the video decoder 30 in decoding video data. Such syntax may also be included with the encoded video data stored on the storage medium 34 or the file server 36. Each of the video encoder 20 and the video decoder 30 may form part of a respective encoder-decoder (CODEC) that is capable of encoding or decoding video data.

The display device 32 may be integrated with, or external to, the destination device 14. In some examples, the destination device 14 may include an integrated display device and also be configured to interface with an external display device. In other examples, the destination device 14 may be a display device. In general, the display device 32 displays the decoded video data to a user, and may comprise any of a variety of display devices such as a liquid crystal display (LCD), a plasma display, an organic light emitting diode (OLED) display, or another type of display device.

In the example of FIG. 1, the communication channel 16 may comprise any wireless or wired communication medium, such as a radio frequency (RF) spectrum or one or more physical transmission lines, or any combination of wireless and wired media. The communication channel 16 may form part of a packet-based network, such as a local area network, a wide-area network, or a global network such as the Internet. The communication channel 16 generally represents any suitable communication medium, or collection of different communication media, for transmitting video data from the source device 12 to the destination device 14, including any suitable combination of wired or wireless media. The communication channel 16 may include routers, switches, base stations, or any other equipment that may be useful to facilitate communication from the source device 12 to the destination device 14.

The video encoder 20 and the video decoder 30 may operate according to a video compression standard, such as the HEVC standard presently under development, and may conform to the HEVC Test Model (HM). Alternatively, the video encoder 20 and the video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples include MPEG-2 and ITU-T H.263.

Although not shown in FIG. 1, in some aspects, the video encoder 20 and the video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

The video encoder 20 and the video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of the video encoder 20 and the video decoder 30 may be included in one or more encoders or decoders, either of which may be integrated as part of a combined encoder/decoder (CODEC) in a respective device.

The video encoder 20 may implement any or all of the techniques of this disclosure for adaptive loop filtering in a video coding process. Likewise, the video decoder 30 may implement any or all of these techniques for adaptive loop filtering in a video coding process. A video coder, as described in this disclosure, may refer to a video encoder or a video decoder. Similarly, a video coding unit may refer to a video encoder or a video decoder. In this context, a video coding unit is physical hardware and differs from the CU data structure discussed above. Likewise, video coding may refer to video encoding or video decoding.

In one example of the disclosure, video encoder 20 may be configured to perform luma adaptive loop filtering for luma components of a block of pixels, and perform chroma adaptive loop filtering for chroma components of the block of pixels, wherein filter coefficients for both the luma adaptive loop filtering and chroma adaptive loop filtering are derived from a block-based mode or a region-based mode.

Likewise, in another example of the disclosure, video decoder 30 may be configured to perform luma adaptive loop filtering for luma components of a block of pixels, and perform chroma adaptive loop filtering for chroma components of the block of pixels, wherein filter coefficients for both the luma adaptive loop filtering and chroma adaptive loop filtering are derived from a block-based mode or a region-based mode.

Figure 2:
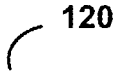
FIG. 2 is a conceptual diagram showing region-based classification for an adaptive loop filter.

In one ALF proposal for HEVC, two adaptation modes (i.e., block-based and region-based adaptation modes) are proposed. For a region-based adaptation mode, a frame is divided into 16 regions, and each region can have one set of linear filter coefficients (a plurality of AC coefficients and one DC coefficient). In other examples, more or fewer regions may be used. A region may share the same filter coefficients with other regions. FIG. 2 is a conceptual diagram showing region-based classification for an adaptive loop filter. As shown in FIG. 2, frame 120 is divided into 16 regions, and each region may include multiple CUs. Each of these 16 regions is represented by a number (0-15) that indicates the particular set of linear filter coefficients used by that region. The numbers (0-15) may be index numbers to a predetermined set of filter coefficients that are stored at both a video encoder and a video decoder. That is, each number (0-15) may be an index to a particular one of a plurality of sets of filter coefficients. In one example, a video encoder may signal, in the encoded video bitstream, the index number of the set of filter coefficients used by the video encoder for a particular region. Based on the signaled index, a video decoder may retrieve the same predetermined set of filter coefficients, from among a plurality of different sets of filter coefficients, to use in the decoding process for that region. In other examples, the filter coefficients are signaled explicitly for each region, e.g., by the encoder as syntax elements in the encoded bitstream received by the decoder.

Figure 3:
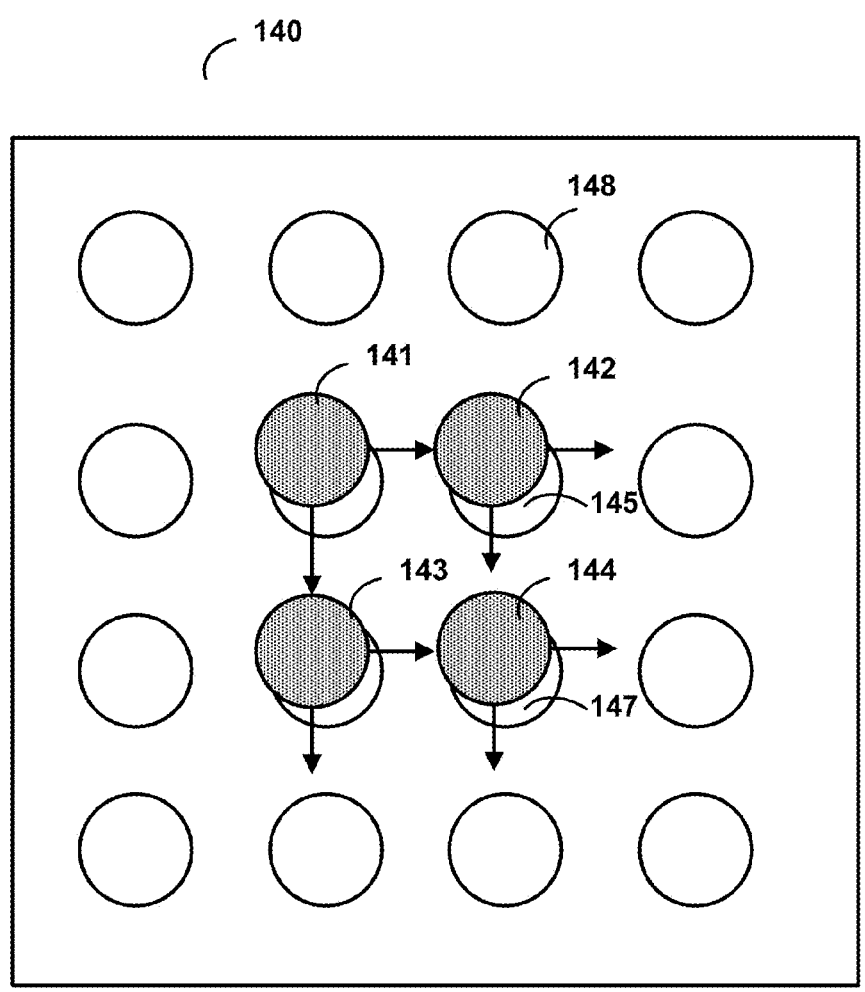
FIG. 3 is a conceptual diagram showing block-based classification for an adaptive loop filter.

For a block-based adaptation mode, a frame is divided in to 4×4 blocks, and each 4×4 block derives one class by computing a metric using direction and activity information. For each class, one set of linear filter coefficients (a plurality of AC coefficients and one DC coefficient) can be used and one class can share the same filter coefficients with other classes. FIG. 3 is a conceptual diagram showing block-based classification for an adaptive loop filter.

The computation of the direction and activity, and the resulting metric based on direction and activity, are shown below:

Direction
$\mathrm{Ver\_act}(i,j)=\mathrm{abs}(X(i,j)\ll 1 - X(i,j-1) - X(i,j+1))$
$\mathrm{Hor\_act}(i,j)=\mathrm{abs}(X(i,j)\ll 1 - X(i-1,j) - X(i+1,j))$
$H_B = \Sigma_{i=1,2} \Sigma_{j=1,2} H(i,j)$
$V_B = \Sigma_{i=1,2} \Sigma_{j=1,2} V(i,j)$
Direction=0, $1(H_B > 2V_B)$, $2(V_B > 2H_B)$ Activity $L_B = H_B + V_B$ N classes (0, 1, 2, ..., N−1)

Metric

Activity+N*Direction

Hor_act (i, j) generally refers to the horizontal activity of current pixel (i, j), and Vert_act(i, j) generally refers to the vertical activity of current pixel (i,j). X(i, j) generally refers to a pixel vale of pixel (i, j)), where i and j indicate horizontal and vertical coordinates of the current pixel within a frame or block. In this context, activity is generally the gradient or variance among pixels in a location.

$H_B$ refers to the horizontal activity of the 4×4 block, which in this example is determined based on a sum of horizontal activity for pixels (1, 1), (1, 2), (2, 1), and (2, 2). $V_B$ refers to the vertical activity of the 4×4 block, which in this example is determined based on a sum of vertical activity for pixels (1, 1), (1, 2), (2, 1), and (2, 2). "<<1" represents a multiply by two operation. Based on the values of $H_B$ and $V_B$, a direction can be determined. As one example, if the value of $H_B$ is more than 2 times the value of $V_B$, then the direction can be determined to be direction 1 (i.e. horizontal), which might correspond to more horizontal activity than vertical activity. If the value of $V_B$ is more than 2 times the value of $H_B$, then the direction can be determined to be direction 2 (i.e. vertical), which might correspond to more vertical activity than horizontal activity. Otherwise, the direction can be determined to be direction 0 (i.e. no direction), meaning neither horizontal nor vertical activity is dominant. The labels for the various directions and the ratios used to determine the directions merely constitute one example, as other labels and ratios can also be used.

Activity ($L_B$) for the 4×4 block can be determined as a sum of the horizontal and vertical activity. The value of $L_B$ can be classified into a range. This particular example shows N ranges. That is, any number of ranges may be used. Based on the combination of activity and direction, a filter for the 4×4 block of pixels can be selected. As one example, a filter may be selected based on a two-dimensional mapping of activity and direction to filters, or activity and direction may be combined into a single metric, and that single metric may be used to select a filter (e.g., the metric=Activity+N*Direction).

Returning to FIG. 3, block 140 represents a 4×4 block of pixels. In this example, only four of the sixteen pixels are used to calculate activity and direction metrics for a block-based ALF. The four pixels are pixel (1, 1) which is labeled as pixel 141, pixel (2, 1) which is labeled as pixel 142, pixel (1, 2) which is labeled as pixel 143, and pixel (2, 2) which is labeled as pixel 144. The Horizontal activity of pixel 141 (i.e., hor_act(1, 1)), for example, is determined based on a left neighboring pixel and a right neighboring pixel. The right neighboring pixel is labeled as pixel 145 and the left neighboring pixel is labeled as pixel 146. The vertical activity of pixel 142 (i.e., ver_act(2, 1)), for example, is determined based on an upper neighboring pixel and a lower neighboring pixel. The lower neighboring pixel is labeled as pixel 147, and the upper neighboring pixel is labeled as pixel 148. Horizontal and vertical activity may be calculated for pixels 143 and 144 in a similar manner.

In previous adaptive loop filter proposals for HEVC, the luma and chroma components within a particular block of pixels use different adaptive loop filters. For luma components, the region or block-based adaptive ALF described above is used. The region or block-based adaptive ALF may utilize multiple filters (e.g., a maximum of 16 filters). Furthermore, the decision to use the luma ALF may be made on a CU by CU basis using a CU level ALF on/off decision flag. For chroma components, only one filter is used. The decision to use the ALF for the chroma components is not controlled independently of the luma ALF. Instead, the chroma ALF filter is only enabled when the luma ALF filter is enabled (i.e., when the CU level ALF flag is on).

Figure 4:
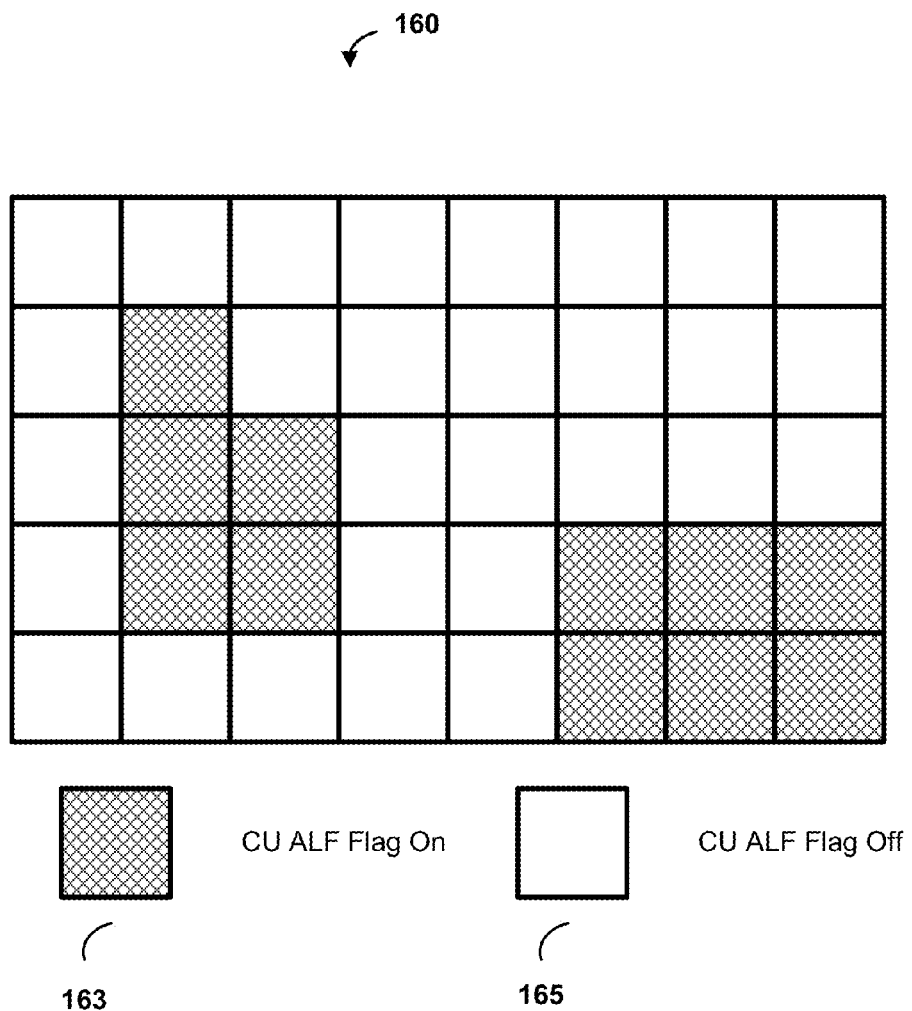
FIG. 4 is a conceptual diagram showing an example coding unit (CU) level ALF on/off flag map.

FIG. 4 depicts a conceptual map of the use of a CU level ALF on/off decision flag. Picture 160 is broken into multiple CUs for coding. In the example of FIG. 4, the CUs are depicted as being of identical size for ease of understanding. However, CUs may be of different sizes. For example, CUs in HEVC may be partitioned according to a quadtree structure.

In FIG. 4, the CUs 163, with the hashed marking, have been coded with an ALF flag that is on (e.g., ALF flag=1). As such, according to previous proposals for HEVC, both a video encoder and decoder would apply the ALF to both luma and chroma components of the pixels in that CU. A video encoder may further signal the ALF coefficients used, or an index indicating the ALF coefficients used, in the encoded video bitstream so that a video decoder may apply the same ALF coefficients in the decoding process. The CUs 165, with no marking, have been coded with an ALF flag that is off (e.g., ALF flag=0). In this case, no ALF is applied to either the luma components or the pixel components in that CU.

Using only one ALF for chroma components, as well as not applying ALF for chroma components independently of ALF for luma components, may limit the quality of ALF for 4:2:0 pixel formats. Accordingly, this disclosure proposes techniques to allow more flexibility in filtering chroma components in the ALF. In other examples, the techniques of this disclosure for ALF of chroma components are not limited to just the 4:2:0 pixel format. The ALF techniques of this disclosure may be applied to chroma components in other pixel formats, such as 4:2:2 and 4:4:4 pixel formats.

In one example, this disclosure proposes that the ALF for chroma components be independently controlled from the ALF for luma components. In one particular example, both the luma ALF and the chroma ALF may have their own, independent CU level ALF on/off decision flag. That is, filtering luma components with the ALF is indicated with a CU level luma ALF on/off flag, and filtering chroma components with the ALF is indicated with a CU level chroma ALF on/off flag.

Figure 5:
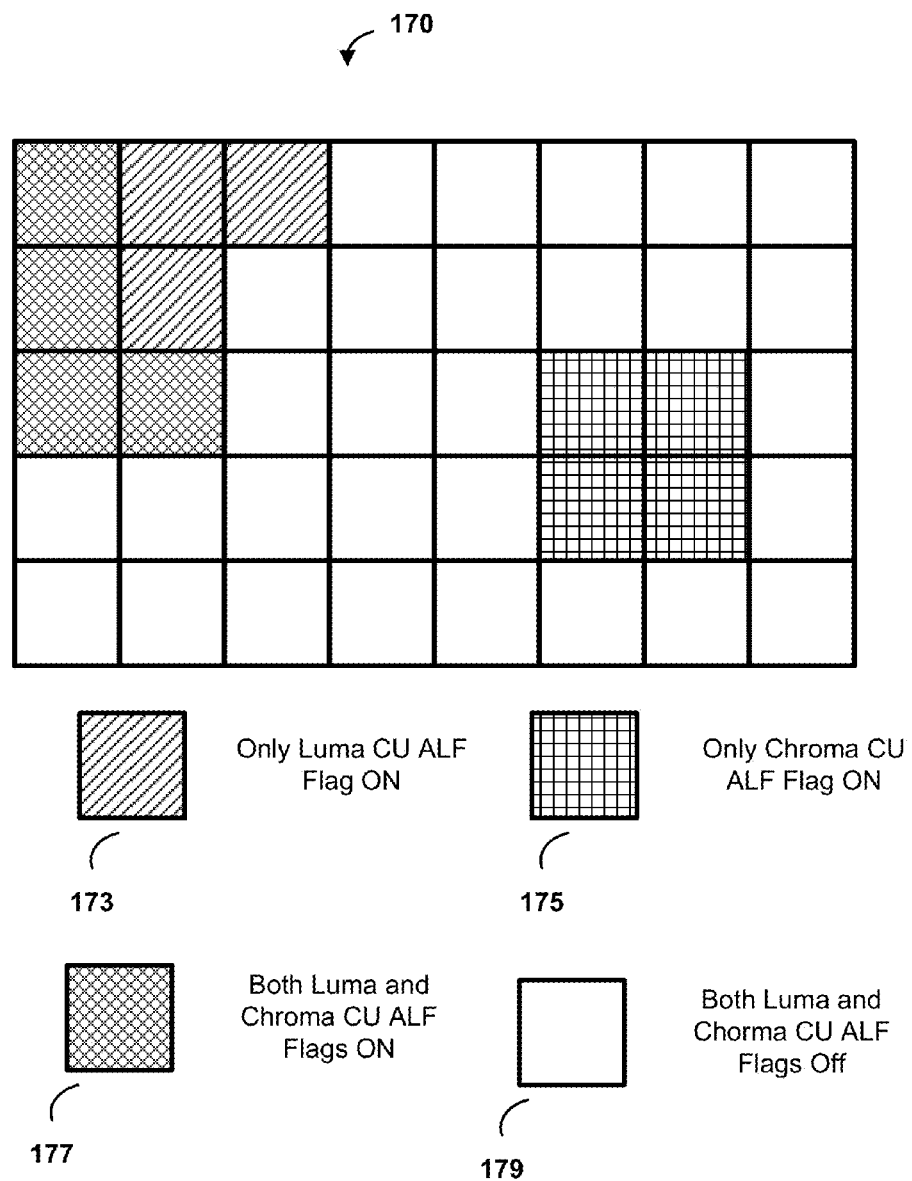
FIG. 5 is a conceptual diagram showing another example coding unit (CU) level ALF on/off flag map.

FIG. 5 depicts a conceptual map of the use of a luma and chroma CU level ALF on/off decision flag. Picture 170 is broken into multiple CUs for coding. Again, in the example of FIG. 5, the CUs are depicted as being of identical size for ease of understanding. However, CUs may be of different sizes. For example, CUs in HEVC may be partitioned according to a quadtree structure.

In FIG. 5, the CUs 173, with the uni-directional hashed marking, have been coded with only a luma ALF flag that is on (e.g., luma ALF flag=1). For CUs 173, the chroma ALF flag is off (e.g., chroma ALF flag=0). For CUs 173, the ALF is only applied to luma components of the pixels. No ALF is applied to the chroma components. For CUs 175, with the checkerboard marking, only the chroma ALF flag is on (e.g., chroma ALF flag=1). For CUs 175, the luma ALF flag is off (e.g., luma ALF flag=0). As such, for CUs 175, the ALF is only applied to chroma components of the pixels. No ALF is applied to the luma components. For CUs 177, with the bi-directional diagonal marking, both the luma ALF flag and the chroma ALF flag is on (e.g., luma ALF flag=1 and chroma ALF flag=1). As such, for CUs 177, the ALF is applied to both luma and chroma components of the pixels.

For CUs 179, with the bi-directional hashed marking, both the luma ALF flag and the chroma ALF flag is off (e.g., luma ALF flag=0 and chroma ALF flag=0). As such, for CUs 179, no ALF is applied to either the luma or the chroma components of the pixels.

As can be seen from FIG. 5, using independent CU level ALF decision flags for the luma and chroma components allows for situations where only luma components are filtered with the ALF, where only chroma components are filtered with the ALF, where both luma and chroma components are filtered with the ALF, and where neither the luma nor chroma components are filtered with the ALF. As such, the application of ALF to pixel components may be applied with more flexibility. It should be noted that this concept may be further extended to independently applying ALF to the Cr and Cb components individually. That is, rather than having a single chroma ALF flag that applies to both the Cr and Cb components, individual Cr ALF and Cb ALF flags may be used to indicate the application of ALF to Cr and Cb components independently.

In another example of the disclosure, the chroma ALF, for any sub-sampling format, may use the same or similar region or block-based adaptive ALFs as used by the luma ALF. That is, instead of restricting the chroma ALF to only one filter, the ALF for chroma components may be determined according to the region or block-based classification ALF techniques described above with reference to FIG. 2 and FIG. 3. In some examples, region or block-based adaptive ALF may be applied to both chroma components (i.e., Cr and Cb). In other examples, region or block-based adaptive ALF may be applied to only one chroma component (i.e., Cr or Cb), and another ALF may be applied to the other chroma component (e.g., a single ALF). That is, the Cr and Cb components may use the same region or block-based classification techniques, and ultimately be filtered by the same determined set of filter coefficients. In another example, the ALF for the Cr and Cb components may be determined independently.

Extending ALF techniques used for luma components to the chroma components may increase the amount of information that may be signaled in the encoded video bitstream to define the chroma ALF. As such, in another example of the disclosure, techniques for reducing the amount of filter information (e.g., CU level ALF on/off flag, filter coefficients, region or block-based classifications, etc.) needed to store and/or signal such information used for the chroma ALF is proposed. As one general example, the filter information for the luma ALF may be used for the chroma ALF. For example, the filter information for the luma ALF may be copied or used as a predictor for the filter information for the chroma ALF.

In one example, the map of CU level on/off flags for the luma ALF (i.e., syntax that indicates which CUs have an enabled luma ALF) may be used by the chroma ALF. That is in situations where chroma components use region or block-based adaptive ALF, the CU level ALF flag for luma components may also be used by the chroma components. In this situation, the decision to use a chroma ALF is not independent of the luma ALF. However, the actual filter used may be different. For example, the luma components may be filtered according to a region-based adaptive ALF, while the chroma components are filtered according to a block-based adaptive ALF, or vice versa. As another example, both luma and chroma components may use the same type of ALF (i.e., region-based or block-based), but different filter coefficients may be determined for the luma and chroma components.

In another example, the actual filter coefficients determined according to region or block-based classification for use by the luma ALF may also be used for the chroma ALF. In this example, the filter coefficients may be shared in situations where both the luma ALF and chroma ALF are indicated as being enabled by their respective CU level on/off flags (e.g., luma ALF flag and chroma ALF flag). That is, the filter coefficients may be shared in situations where both the luma and chroma ALF are enabled, even if the chroma ALF is able to be turned on and off independently of the luma ALF. In another example, the filter coefficients of the luma ALF may be shared by the chroma ALF in the example where the chroma ALF also shares the CU level on/off flag of the luma ALF.

In another example of the disclosure, additional filter information may be shared between the luma and chroma ALFs. For example, the block-based classification used for the luma ALF may also be used by the chroma ALF. As with sharing the filter coefficients, sharing of the block-based classification may be done in cases where the chroma ALF shares the CU level on/off flag with the luma ALF, or when the chroma ALF has an independent CU level/on off flag.

In still another example, the filter coefficients for the chroma ALF may be predicted from the filter coefficients of the luma ALF. In this example, at the video encoder, filter coefficients for both a luma ALF and a chroma ALF may be calculated independently. Filter coefficients for the luma ALF are then signaled in the encoded video bitstream. Instead of also signaling the chroma ALF coefficients, the difference between the luma ALF coefficients and the chroma ALF coefficients is calculated and signaled. The difference between the luma and chroma ALF coefficients will generally comprise less data (e.g., fewer bits) then signaling the chroma ALF coefficients themselves, thus improving coding efficiency. At the video decoder, the received difference between the luma ALF coefficients and the chroma ALF coefficients may be added to the received luma ALF coefficients in order to reconstruct the chroma ALF coefficients. This technique may be used when both the Cr and Cb components use the same filter coefficients, or in circumstances where the Cr and Cb components use different sets of filter coefficients. In the circumstance where Cr and Cb components use different sets of filter coefficients, each set may be predicted from the luma ALF coefficients.

As discussed above, in some examples, the chroma ALF may be made up of a separate Cr chroma ALF for the Cr chroma components and a separate Cb chroma ALF for the Cb chroma components. Similarly to the techniques described above relating to sharing filter information between a luma ALF and a chroma ALF, filter information may also be shared between Cr and Cb chroma ALFs.

In one example, the map of CU level on/off flags for the Cr chroma ALF (i.e., syntax that indicates which CUs have an enabled Cr chroma ALF) may be used by the Cb chroma ALF. In another example, the filter coefficients used by the Cr chroma ALF may be used for the Cb chroma ALF. In yet another example, the block-based classification used for the Cr chroma ALF may be used by the Cb chroma ALF. In still another example, the filter coefficients for the Cb chroma ALF may be predicted from the filter coefficients of the Cr chroma ALF, or vice versa.

Figure 6:
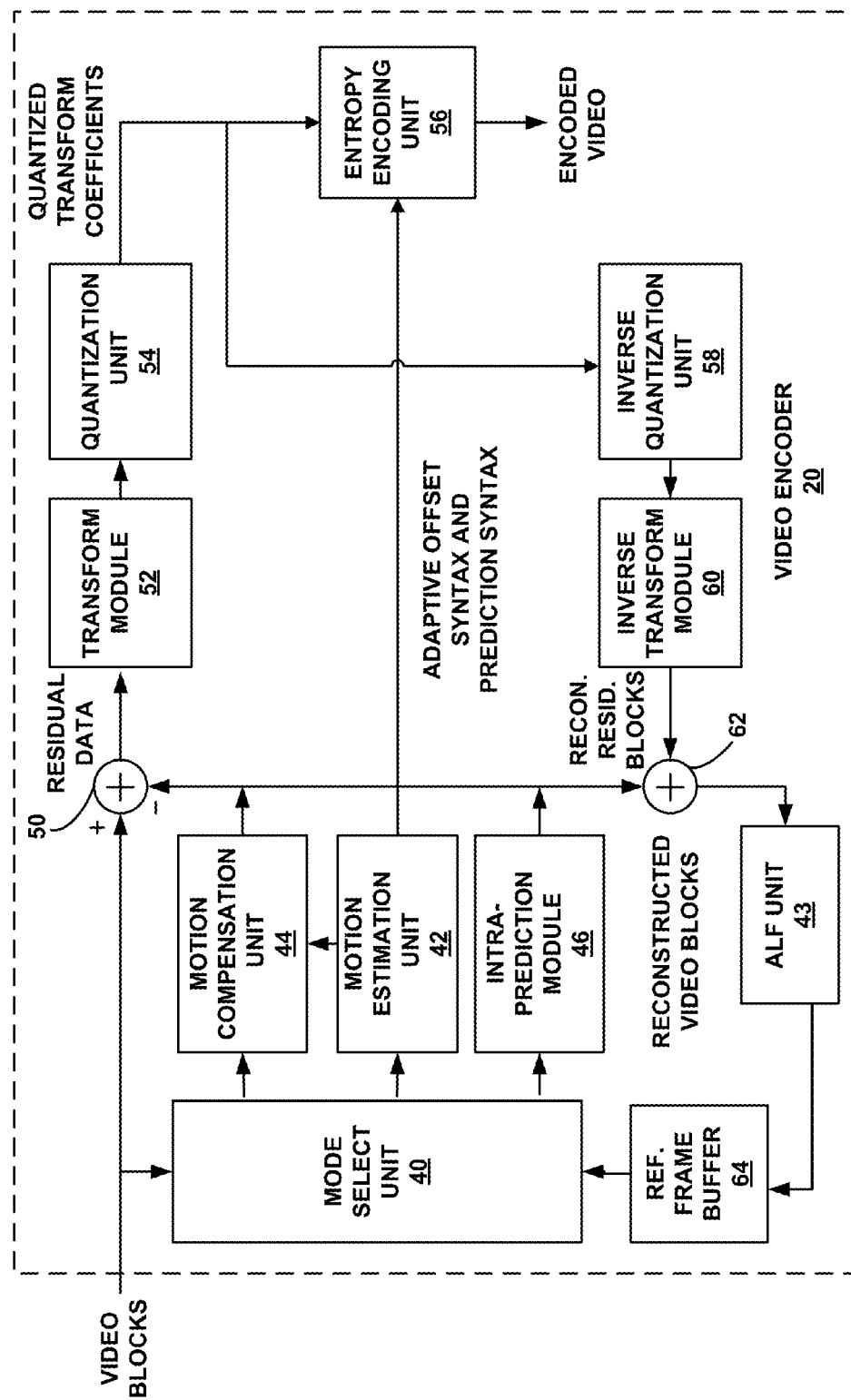
FIG. 6 is a block diagram illustrating an example video encoder.

FIG. 6 is a block diagram illustrating an example of a video encoder 20 that may use techniques for adaptive loop filtering in a video coding process as described in this disclosure. The video encoder 20 will be described in the context of HEVC coding for purposes of illustration, but without limitation of this disclosure as to other coding standards or methods that may require adaptive loop filtering. The video encoder 20 may perform intra- and inter-coding of CUs within video frames. Intra-coding relies on spatial prediction to reduce or remove spatial redundancy in video data within a given video frame. Inter-coding relies on temporal prediction to reduce or remove temporal redundancy between a current frame and previously coded frames of a video sequence. Intra-mode (I-mode) may refer to any of several spatial-based video compression modes. Inter-modes such as uni-directional prediction (P-mode) or bi-directional prediction (B-mode) may refer to any of several temporal-based video compression modes.

As shown in FIG. 6, the video encoder 20 receives a current video block within a video frame to be encoded. In the example of FIG. 6, the video encoder 20 includes a motion compensation unit 44, a motion estimation unit 42, an intra-prediction module 46, a reference frame buffer 64, a summer 50, a transform module 52, a quantization unit 54, and an entropy encoding unit 56. For video block reconstruction, the video encoder 20 also includes an inverse quantization unit 58, an inverse transform module 60, a summer 62, and an ALF unit 43. A deblocking filter may also be included to filter block boundaries to remove blockiness artifacts from reconstructed video. If desired, the deblocking filter would typically filter the output of the summer 62.

During the encoding process, the video encoder 20 receives a video frame or slice to be coded. The frame or slice may be divided into multiple video blocks, e.g., largest coding units (LCUs). The motion estimation unit 42 and the motion compensation unit 44 perform inter-predictive coding of the received video block relative to one or more blocks in one or more reference frames to provide temporal compression. The intra-prediction module 46 may perform intra-predictive coding of the received video block relative to one or more neighboring blocks in the same frame or slice as the block to be coded to provide spatial compression.

The mode select unit 40 may select one of the coding modes, intra or inter, e.g., based on rate distortion results for each mode, and provides the resulting intra- or inter-predicted block (e.g., a prediction unit (PU)) to the summer 50 to generate residual block data and to the summer 62 to reconstruct the encoded block for use in a reference frame. Summer 62 combines the predicted block with inverse quantized, inverse transformed data from inverse transform module 60 for the block to reconstruct the encoded block, as described in greater detail below. Some video frames may be designated as I-frames, where all blocks in an I-frame are encoded in an intra-prediction mode. In some cases, the intra-prediction module 46 may perform intra-prediction encoding of a block in a P- or B-frame, e.g., when motion search performed by the motion estimation unit 42 does not result in a sufficient prediction of the block.

The motion estimation unit 42 and the motion compensation unit 44 may be highly integrated, but are illustrated separately for conceptual purposes. Motion estimation (or motion search) is the process of generating motion vectors, which estimate motion for video blocks. A motion vector, for example, may indicate the displacement of a prediction unit in a current frame relative to a reference sample of a reference frame. The motion estimation unit 42 calculates a motion vector for a prediction unit of an inter-coded frame by comparing the prediction unit to reference samples of a reference frame stored in the reference frame buffer 64. A reference sample may be a block that is found to closely match the portion of the CU including the PU being coded in terms of pixel difference, which may be determined by sum of absolute difference (SAD), sum of squared difference (SSD), or other difference metrics. The reference sample may occur anywhere within a reference frame or reference slice, and not necessarily at a block (e.g., coding unit) boundary of the reference frame or slice. In some examples, the reference sample may occur at a fractional pixel position.

The motion estimation unit 42 sends the calculated motion vector to the entropy encoding unit 56 and the motion compensation unit 44. The portion of the reference frame identified by a motion vector may be referred to as a reference sample. The motion compensation unit 44 may calculate a prediction value for a prediction unit of a current CU, e.g., by retrieving the reference sample identified by a motion vector for the PU.

The intra-prediction module 46 may perform intra-prediction on the received block, as an alternative to inter-prediction performed by the motion estimation unit 42 and the motion compensation unit 44. The intra-prediction module 46 may predict the received block relative to neighboring, previously coded blocks, e.g., blocks above, above and to the right, above and to the left, or to the left of the current block, assuming a left-to-right, top-to-bottom encoding order for blocks. The intra-prediction module 46 may be configured with a variety of different intra-prediction modes. For example, the intra-prediction module 46 may be configured with a certain number of directional prediction modes, e.g., thirty-five directional prediction modes, based on the size of the CU being encoded.

The intra-prediction module 46 may select an intra-prediction mode by, for example, calculating error values for various intra-prediction modes and selecting a mode that yields the lowest error value. Directional prediction modes may include functions for combining values of spatially neighboring pixels and applying the combined values to one or more pixel positions in a PU. Once values for all pixel positions in the PU have been calculated, the intra-prediction module 46 may calculate an error value for the prediction mode based on pixel differences between the PU and the received block to be encoded. The intra-prediction module 46 may continue testing intra-prediction modes until an intra-prediction mode that yields an acceptable error value is discovered. The intra-prediction module 46 may then send the PU to the summer 50.

The video encoder 20 forms a residual block by subtracting the prediction data calculated by the motion compensation unit 44 or the intra-prediction module 46 from the original video block being coded. The summer 50 represents the component or components that perform this subtraction operation. The residual block may correspond to a two-dimensional matrix of pixel difference values, where the number of values in the residual block is the same as the number of pixels in the PU corresponding to the residual block. The values in the residual block may correspond to the differences, i.e., error, between values of co-located pixels in the PU and in the original block to be coded. The differences may be chroma or luma differences depending on the type of block that is coded.

The transform module 52 may form one or more transform units (TUs) from the residual block. The transform module 52 selects a transform from among a plurality of transforms. The transform may be selected based on one or more coding characteristics, such as block size, coding mode, or the like. The transform module 52 then applies the selected transform to the TU, producing a video block comprising a two-dimensional array of transform coefficients. The transform module 52 may signal the selected transform partition in the encoded video bitstream.

The transform module 52 may send the resulting transform coefficients to the quantization unit 54. The quantization unit 54 may then quantize the transform coefficients. The entropy encoding unit 56 may then perform a scan of the quantized transform coefficients in the matrix according to a scanning mode. This disclosure describes the entropy encoding unit 56 as performing the scan. However, it should be understood that, in other examples, other processing units, such as the quantization unit 54, could perform the scan.

Once the transform coefficients are scanned into the one-dimensional array, the entropy encoding unit 56 may apply entropy coding such as CAVLC, CABAC, syntax-based context-adaptive binary arithmetic coding (SBAC), or another entropy coding methodology to the coefficients.

To perform CAVLC, the entropy encoding unit 56 may select a variable length code for a symbol to be transmitted. Codewords in VLC may be constructed such that relatively shorter codes correspond to more likely symbols, while longer codes correspond to less likely symbols. In this way, the use of VLC may achieve a bit savings over, for example, using equal-length codewords for each symbol to be transmitted.

To perform CABAC, the entropy encoding unit 56 may select a context model to apply to a certain context to encode symbols to be transmitted. The context may relate to, for example, whether neighboring values are non-zero or not. The entropy encoding unit 56 may also entropy encode syntax elements, such as the signal representative of the selected transform. In accordance with the techniques of this disclosure, the entropy encoding unit 56 may select the context model used to encode these syntax elements based on, for example, an intra-prediction direction for intra-prediction modes, a scan position of the coefficient corresponding to the syntax elements, block type, and/or transform type, among other factors used for context model selection.

Following the entropy coding by the entropy encoding unit 56, the resulting encoded video may be transmitted to another device, such as the video decoder 30, or archived for later transmission or retrieval.

In some cases, the entropy encoding unit 56 or another unit of the video encoder 20 may be configured to perform other coding functions, in addition to entropy coding. For example, the entropy encoding unit 56 may be configured to determine coded block pattern (CBP) values for CU's and PU's. Also, in some cases, the entropy encoding unit 56 may perform run length coding of coefficients.

The inverse quantization unit 58 and the inverse transform module 60 apply inverse quantization and inverse transformation, respectively, to reconstruct the residual block in the pixel domain, e.g., for later use as a reference block. The motion compensation unit 44 may calculate a reference block by adding the residual block to a predictive block of one of the frames of the reference frame buffer 64. The motion compensation unit 44 may also apply one or more interpolation filters to the reconstructed residual block to calculate sub-integer pixel values for use in motion estimation. The summer 62 adds the reconstructed residual block to the motion compensated prediction block produced by the motion compensation unit 44 to produce a reconstructed video block.

The ALF unit 43 may then perform adaptive loop filtering in accordance with the techniques described above. In one example, the ALF unit 43 may be configured to determine filter coefficients for chroma components of a reconstructed block using region or block-based classification techniques. In another example, the decision to apply chroma ALF may be made at the CU level and may be made independently of the decision to apply ALF to luma components. The actual ALF filter information determined for both the luma and chroma components may be signaled in the encoded video bitstream. The filter information may include the actual filter coefficients, an index indicating the filter coefficients, block or region-based classifications, and/or CU level on/off decision flags. In some examples, the chroma ALF filter coefficients may be predicted from luma ALF filter coefficients.

The filtered reconstructed video block is then stored in the reference frame buffer 64. The reconstructed video block may be used by the motion estimation unit 42 and the motion compensation unit 44 as a reference block to inter-code a block in a subsequent video frame.

Figure 7:
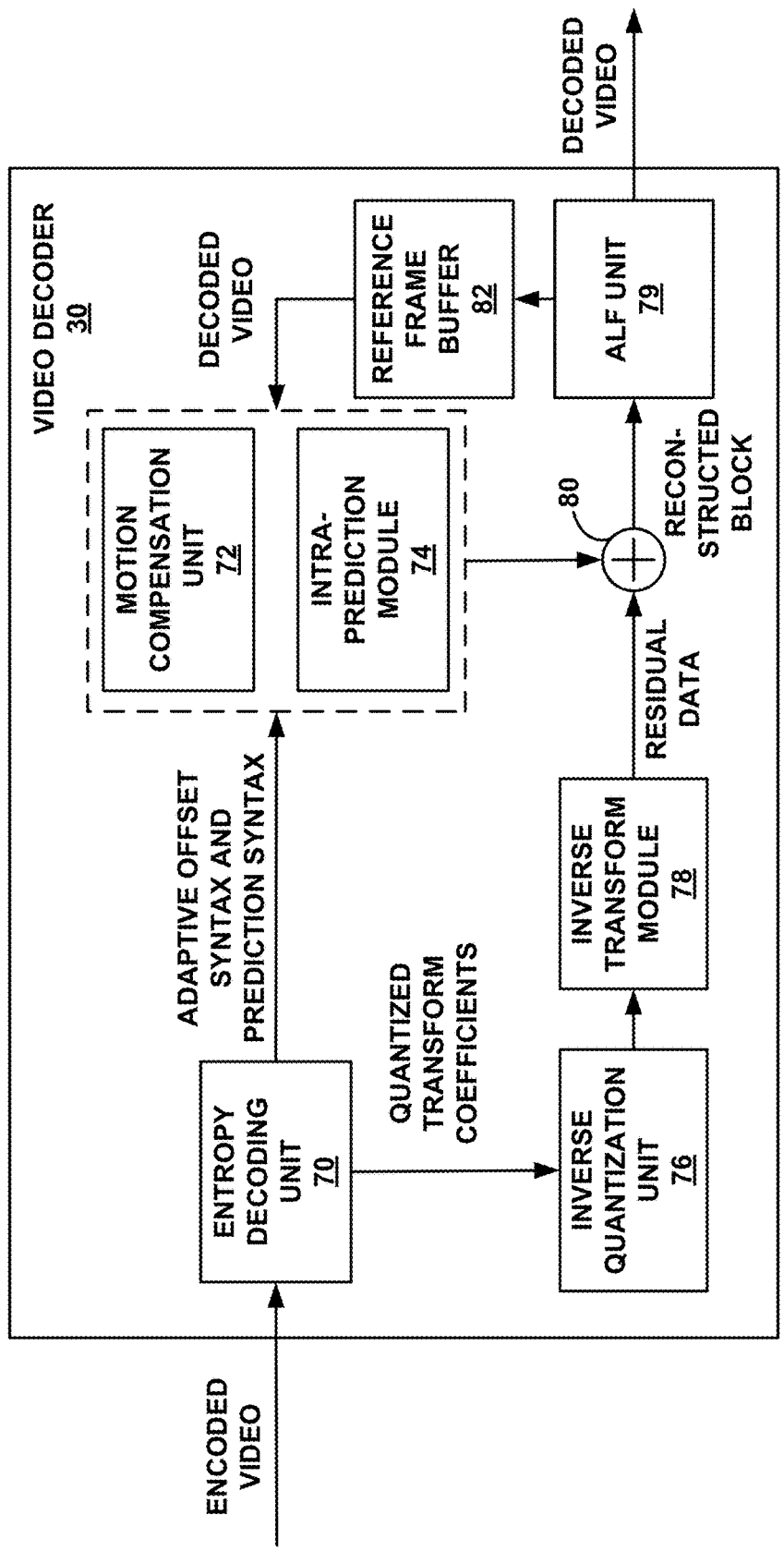
FIG. 7 is a block diagram illustrating an example video decoder.

FIG. 7 is a block diagram illustrating an example of a video decoder 30, which decodes an encoded video sequence. In the example of FIG. 7, the video decoder 30 includes an entropy decoding unit 70, a motion compensation unit 72, an intra-prediction module 74, an inverse quantization unit 76, an inverse transformation unit 78, a reference frame buffer 82, an ALF unit 79, and a summer 80. The video decoder 30 may, in some examples, perform a decoding pass generally reciprocal to the encoding pass described with respect to the video encoder 20 (see FIG. 6).

The entropy decoding unit 70 performs an entropy decoding process on the encoded bitstream to retrieve a one-dimensional array of transform coefficients. The entropy decoding process used depends on the entropy coding used by the video encoder 20 (e.g., CABAC, CAVLC, etc.). The entropy coding process used by the encoder may be signaled in the encoded bitstream or may be a predetermined process.

In some examples, the entropy decoding unit 70 (or the inverse quantization unit 76) may scan the received values using a scan mirroring the scanning mode used by the entropy encoding unit 56 (or the quantization unit 54) of the video encoder 20. Although the scanning of coefficients may be performed in the inverse quantization unit 76, scanning will be described for purposes of illustration as being performed by the entropy decoding unit 70. In addition, although shown as separate functional units for ease of illustration, the structure and functionality of the entropy decoding unit 70, the inverse quantization unit 76, and other units of the video decoder 30 may be highly integrated with one another.

The inverse quantization unit 76 inverse quantizes, i.e., de-quantizes, the quantized transform coefficients provided in the bitstream and decoded by the entropy decoding unit 70. The inverse quantization process may include a conventional process, e.g., similar to the processes proposed for HEVC or defined by the H.264 decoding standard. The inverse quantization process may include use of a quantization parameter QP calculated by the video encoder 20 for the CU to determine a degree of quantization and, likewise, a degree of inverse quantization that should be applied. The inverse quantization unit 76 may inverse quantize the transform coefficients either before or after the coefficients are converted from a one-dimensional array to a two-dimensional array.

The inverse transform module 78 applies an inverse transform to the inverse quantized transform coefficients. In some examples, the inverse transform module 78 may determine an inverse transform based on signaling from the video encoder 20, or by inferring the transform from one or more coding characteristics such as block size, coding mode, or the like. In some examples, the inverse transform module 78 may determine a transform to apply to the current block based on a signaled transform at the root node of a quadtree for an LCU including the current block. Alternatively, the transform may be signaled at the root of a TU quadtree for a leaf-node CU in the LCU quadtree. In some examples, the inverse transform module 78 may apply a cascaded inverse transform, in which inverse transform module 78 applies two or more inverse transforms to the transform coefficients of the current block being decoded.

The intra-prediction module 74 may generate prediction data for a current block of a current frame based on a signaled intra-prediction mode and data from previously decoded blocks of the current frame.

Based on the retrieved motion prediction direction, reference frame index, and calculated current motion vector, the motion compensation unit produces a motion compensated block for the current portion. These motion compensated blocks essentially recreate the predictive block used to produce the residual data.

The motion compensation unit 72 may produce the motion compensated blocks, possibly performing interpolation based on interpolation filters. Identifiers for interpolation filters to be used for motion estimation with sub-pixel precision may be included in the syntax elements. The motion compensation unit 72 may use interpolation filters as used by the video encoder 20 during encoding of the video block to calculate interpolated values for sub-integer pixels of a reference block. The motion compensation unit 72 may determine the interpolation filters used by the video encoder 20 according to received syntax information and use the interpolation filters to produce predictive blocks.

Additionally, the motion compensation unit 72 and the intra-prediction module 74, in an HEVC example, may use some of the syntax information (e.g., provided by a quadtree) to determine sizes of LCUs used to encode frame (s) of the encoded video sequence. The motion compensation unit 72 and the intra-prediction module 74 may also use syntax information to determine split information that describes how each CU of a frame of the encoded video sequence is split (and likewise, how sub-CUs are split). The syntax information may also include modes indicating how each split is encoded (e.g., intra- or inter-prediction, and for intra-prediction an intra-prediction encoding mode), one or more reference frames (and/or reference lists containing identifiers for the reference frames) for each inter-encoded PU, and other information to decode the encoded video sequence.

The summer 80 combines the residual blocks with the corresponding prediction blocks generated by the motion compensation unit 72 or the intra-prediction module 74 to form decoded blocks. The ALF unit 79 then performs adaptive loop filtering in accordance with the techniques described above. In one example, the ALF unit 79 may be configured to determine filter coefficients for chroma components of a reconstructed block using region or block-based classification techniques. In another example, the decision to apply chroma ALF may be made at the CU level and may be made independently of the decision to apply ALF to luma components. The actual ALF filter information determined for both the luma and chroma components may be received in the encoded video bitstream. The filter information may include the actual filter coefficients, an index indicating the filter coefficients, block or region-based classifications, and/or CU level on/off decision flags. In some examples, the chroma ALF filter coefficients may be predicted from luma ALF filter coefficients.

If desired, a deblocking filter may also be applied to filter the decoded blocks in order to remove blockiness artifacts. The decoded video blocks are then stored in the reference frame buffer 82, which provides reference blocks for subsequent motion compensation and also produces decoded video for presentation on a display device (such as the display device 32 of FIG. 1).

Figure 8:
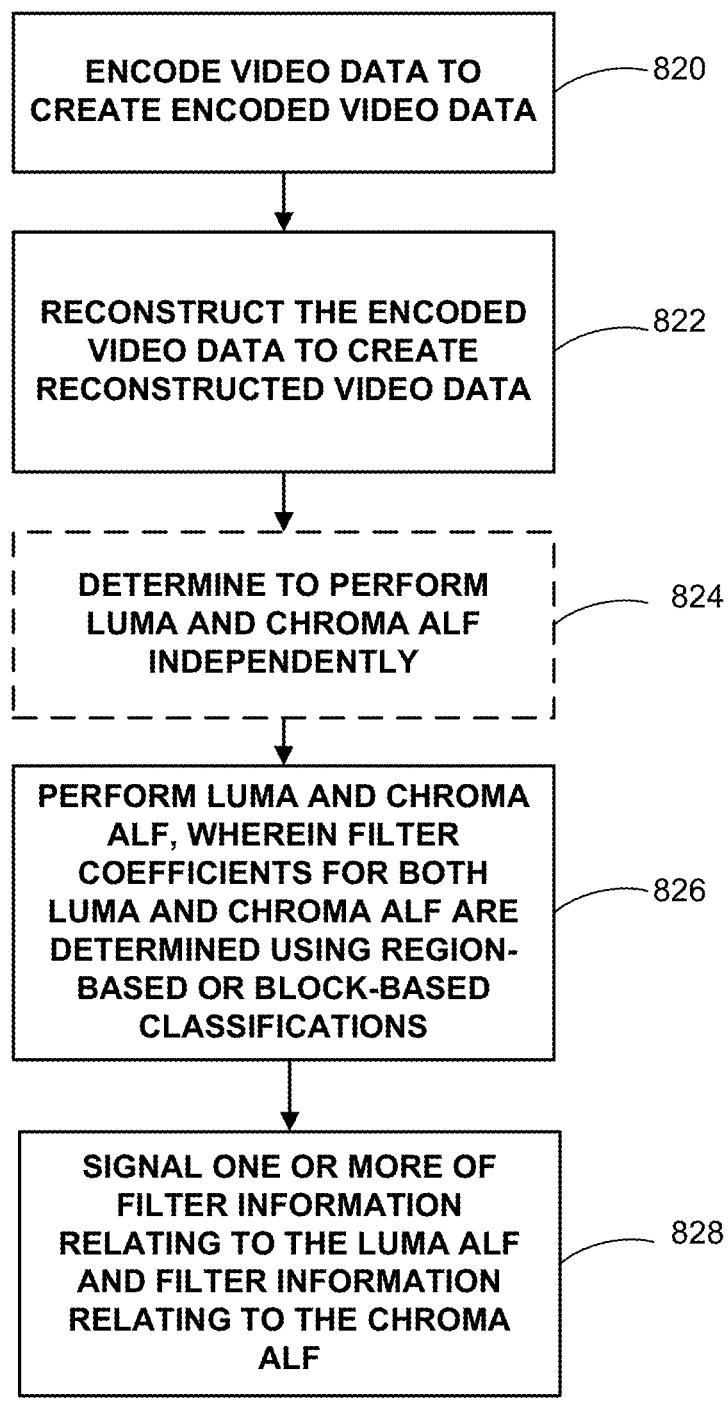
FIG. 8 is a flowchart showing an example encoding method according to the techniques of this disclosure.

FIG. 8 is a flowchart depicting an example video encoding method according to the techniques of this disclosure. The method depicted in FIG. 8 may be performed by one or more functional units of video encoder 20, including ALF unit 43. Video encoder 20 may be configured to encode video data to create encoded video data (820), and to reconstruct the encoded video data to create the reconstructed video data (822). The reconstructed video data may include one or more blocks of pixels.

According to the techniques of this disclosure, in one optional example, video encoder 20 may be configured to determine to perform luma adaptive loop filtering on the block of pixels, and determine to perform chroma adaptive loop filtering on the block of pixels, wherein the determining to perform chroma adaptive loop filtering is performed independently of determining to perform luma adaptive loop filtering (824). Determining to perform chroma adaptive loop filtering may include determining a value of a chroma CU level ALF on/off flag for the chroma components. In other examples of the disclosure, luma and chroma adaptive loop filtering are performed together. In this case, a separate chroma CU level ALF on/off flag need not be determined and signaled, but instead, the chroma ALF may share the luma CU level ALF on/off flag.

Video encoder 20 may be further configured to perform luma adaptive loop filtering for luma components of a block of pixels, and to perform chroma adaptive loop filtering for chroma components of the block of pixels, wherein filter coefficients for both the luma adaptive loop filtering and chroma adaptive loop filtering are derived from a block-based mode or a region-based mode (826). By allowing chroma adaptive loop filtering to be performed based on region or block-based mode classifications, rather than just using a single ALF, more flexibility in performing ALF for chroma components is achieved. The region or block-based techniques for chroma components are not limited to only 4:2:0 chroma sub-sampling formats, but may be applied to any chroma format, including 4:2:0, a 4:2:2 or a 4:4:4 format.

Video encoder 20 may be further configured to signal one or more of filter information relating to the luma adaptive filtering and filter information relating to the chroma adaptive loop filtering (828) e.g., as syntax elements in an encoded video bitstream. The filter information may include a CU level on/off flag, filter coefficients, and/or block-based classification. In some examples, the filter information for both the luma and chroma ALF are signaled separately. In other examples, the filter information of the luma ALF is shared for the chroma ALF. That is, only the luma ALF information is determined and signaled, and the chroma ALF uses the same information at both the video encoder and video decoder. In other examples, the chroma ALF consists of both a Cr component ALF and a Cb component ALF. In this example, the filter information of one the Cr or Cb component may be shared with the ALF of the other component.

In other examples of the disclosure, rather than signaling the entirety of the chroma ALF coefficients, the filter coefficients for the chroma ALF are predicted from the luma ALF. As such, signaling the filter information may include signaling luma ALF coefficients and, for the chroma coefficients, differences between the luma ALF coefficients and the chroma ALF coefficients. In this manner, the value of a chroma coefficient can be obtained by adding the difference for a given chroma coefficient to the value of a corresponding luma coefficient.

Figure 9:
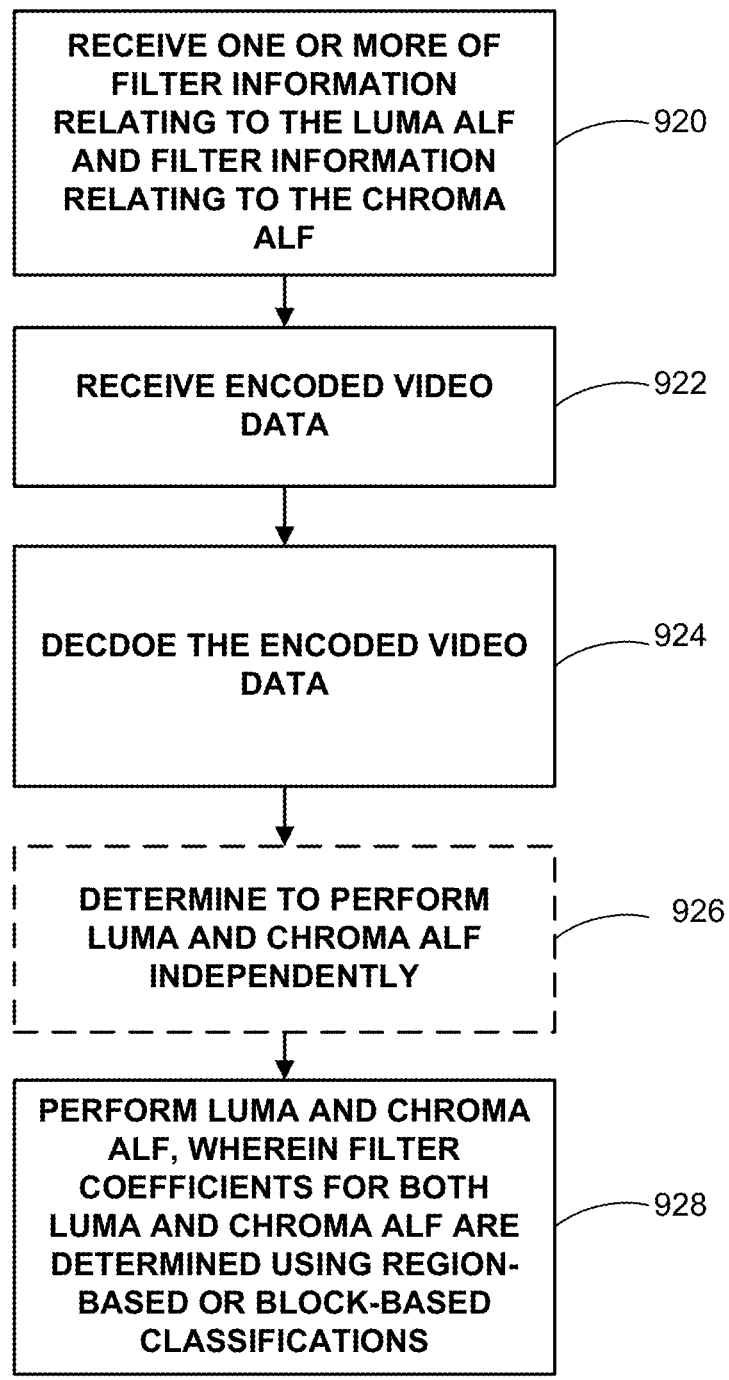
FIG. 9 is a flowchart showing an example decoding method according to the techniques of this disclosure.

FIG. 9 is a flowchart depicting an example video decoding method according to the techniques of this disclosure. The method depicted in FIG. 9 may be performed by one or more functional units of video decoder 30, including ALF unit 79. Video decoder 30 may be configured to receive one or more of filter information relating to a luma ALF and filter information relating to a chroma ALF (920), receive encoded video data (922), and decode the encoded video data to create the decoded video data (924). The decoded video data may include one or more blocks of pixels.

The received filter information may include a CU level on/off flag, filter coefficients, and/or block-based classification. In some examples, the filter information for both the luma and chroma ALF are received separately. In other examples, the filter information of the luma ALF is shared for the chroma ALF. That is, only the luma ALF information is received, and the chroma ALF uses the same information at the video decoder. In other examples, the chroma ALF consists of both a Cr component ALF and a Cb component ALF. In this example, the filter information of one the Cr or Cb component may be shared with the ALF of the other component.

In other examples of the disclosure, rather than receiving the entirety of the chroma ALF coefficients, the filter coefficients for the chroma ALF are predicted from the luma ALF. As such, receiving the filter information may include receiving the luma ALF coefficients and a difference between the luma ALF coefficients and the chroma ALF coefficients. The chroma ALF coefficients may be reconstructed by adding the received difference to the received luma ALF coefficients.

According to the techniques of this disclosure, in one optional example, video encoder 30 may be configured to determine to perform luma adaptive loop filtering on the block of pixels, and determine whether to perform chroma adaptive loop filtering on the block of pixels, wherein the determining to perform chroma adaptive loop filtering is performed independently of determining to perform luma adaptive loop filtering (926). Determining to perform chroma adaptive loop filtering may include determining a value of a received chroma CU level ALF on/off flag for the chroma components. In other examples of the disclosure, luma and chroma adaptive loop filtering are performed together. In this case, a separate chroma CU level ALF on/off flag is not received, but instead, the chroma ALF may share the received luma CU level ALF on/off flag in order to make the determination of whether or not to perform chroma ALF.

Video decoder 30 may be further configured to perform luma adaptive loop filtering for luma components of a block of pixels, and to perform chroma adaptive loop filtering for chroma components of the block of pixels, wherein filter coefficients for both the luma adaptive loop filtering and chroma adaptive loop filtering are derived from a block-based mode or a region-based mode (928). By allowing chroma adaptive loop filtering to be performed based on region or block-based mode classifications, rather than just using a single ALF, more flexibility in performing ALF for chroma components is achieved. The region or block-based techniques for chroma components are not limited to only 4:2:0 chroma sub-sampling formats, but may be applied to any chroma format, including 4:2:0, a 4:2:2 or a 4:4:4 format. The actual filter coefficients, or region or block-based classification, used for the chroma ALF may be indicated as part of the received filter information in the encoded video bitstream.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of adaptive loop filtering in a video coding process comprising:
    determining a status of a coding unit-level luma adaptive loop filtering flag independently from that of a coding unit-level chroma adaptive loop filtering flag;
    determining whether to perform luma adaptive loop filtering on a block of pixels, based at least in part on the coding unit-level luma adaptive loop filtering flag;
    determining whether to perform chroma adaptive loop filtering on the block of pixels, based at least in part on the coding unit-level chroma adaptive loop filtering flag, independently of determining whether to perform luma adaptive loop filtering;
    performing luma adaptive loop filtering for luma components of the block of pixels responsive to determining to perform luma adaptive loop filtering;
    performing chroma adaptive loop filtering for chroma components of the block of pixels responsive to determining to perform chroma adaptive loop filtering; and
    deriving filter coefficients for both the luma adaptive loop filtering and chroma adaptive loop filtering based on one of a block-based classification mode and a region-based classification mode.

2. The method of claim 1, wherein the luma and chroma components of the block of pixels are in a 4:2:0, a 4:2:2 or a 4:4:4 format.

3. The method of claim 1, wherein determining to perform chroma adaptive loop filtering includes determining a value of the coding unit-level chroma adaptive loop filtering flag.

4. The method of claim 1, further comprising:
    sharing filter information of luma adaptive loop filtering for chroma adaptive loop filtering.

5. The method of claim 4, wherein the filter information includes a coding unit (CU) level on/off flag, filter coefficients, and/or block-based classification.

6. The method of claim 1, further comprising:
    predicting the filter coefficients for chroma adaptive loop filtering from the filter coefficients for luma adaptive loop filtering.

7. The method of claim 6, wherein predicting the filter coefficients for chroma adaptive loop filtering includes subtracting chroma filter coefficients from the filter coefficients for luma adaptive loop filtering to create a difference.

8. The method of claim 1, wherein performing chroma adaptive loop filtering includes performing Cr chroma adaptive loop filtering for Cr chroma components of the block of pixels and performing Cb chroma adaptive loop filtering for Cb chroma components for the block of pixels.

9. The method of claim 8, further comprising:
    sharing filter information of Cr chroma adaptive loop filtering for Cb chroma adaptive loop filtering.

10. The method of claim 9, wherein the filter information includes a CU level on/off map, filter coefficients, and/or block-based classification.

11. The method of claim 10, wherein the CU level on/off map includes values of a CU level on/off flag, wherein a CU level on/off flag with a value of 1 indicates that adaptive loop filtering is performed for the block of pixels, and wherein a CU level on/off flag with a value 0 indicates that adaptive loop filtering is not performed for the block of pixels.

12. The method of claim 8, further comprising:
    predicting the filter coefficients for Cb chroma adaptive loop filtering from the filter coefficients for Cr chroma adaptive loop filtering.

13. The method of claim 1, wherein the video coding process is a video encoding process, and wherein the method further comprises:
    encoding video data to create encoded video data;
    reconstructing the encoded video data to create reconstructed video data, wherein the block of pixels is reconstructed video data; and
    signaling one or more of filter information relating to the luma adaptive filtering and filter information relating to the chroma adaptive loop filtering.

14. The method of claim 1, wherein the video coding process is a video decoding process, and wherein the method further comprises:
    receiving one or more of filter information relating to the luma adaptive filtering and filter information relating to the chroma adaptive loop filtering;
    receiving encoded video data; and
    decoding the encoded video data to create decoded video data, wherein the block of pixels is decoded video data.

15. The method of claim 1, the method being executable on a wireless communication device, wherein the device comprises:
    a memory configured to store video data, wherein the video data comprises the block of pixels;
    a processor configured to execute instructions to process the video data stored in the memory; and
    a receiver configured to receive the video data.

16. The method of claim 15, wherein the wireless communication device is a cellular telephone and the video data is received by the receiver and modulated according to a cellular communication standard.

17. An apparatus configured to perform adaptive loop filtering in a video coding process comprising:
    a memory configured to store a block of pixels;
    a video coder configured to:
        determine a status of a coding unit-level luma adaptive loop filtering flag independently from that of a coding unit-level chroma adaptive filtering flag;
        determine whether to perform luma adaptive loop filtering on the block of pixels, based at least in part on the coding unit-level luma adaptive loop filtering flag;
        determine whether to perform chroma adaptive loop filtering on the block of pixels, based at least in part on the coding unit-level chroma adaptive filtering flag, independently of determining whether to perform luma adaptive loop filtering;
        perform luma adaptive loop filtering for luma components of the block of pixels responsive to determining to perform luma adaptive loop filtering;
        perform chroma adaptive loop filtering for chroma components of the block of pixels responsive to determining to perform chroma adaptive loop filtering; and
        derive filter coefficients for both the luma adaptive loop filtering and chroma adaptive loop filtering based on one of a block-based classification mode and a region-based classification mode.

18. The apparatus of claim 17, wherein the luma and chroma components of the block of pixels are in a 4:2:0, a 4:2:2 or a 4:4:4 format.

19. The apparatus of claim 17, wherein the video coder is further configured to determine a value of the coding unit-level chroma adaptive loop filtering flag.

20. The apparatus of claim 17, wherein the video coder is further configured to:
share filter information of luma adaptive loop filtering for chroma adaptive loop filtering.

21. The apparatus of claim 20, wherein the filter information includes a CU level on/off flag, filter coefficients, and/or block-based classification.

22. The apparatus of claim 17, wherein the video coder is further configured to:
predict the filter coefficients for chroma adaptive loop filtering from the filter coefficients for luma adaptive loop filtering.

23. The apparatus of claim 22, wherein the video coder is further configured to:
subtract chroma filter coefficients from the filter coefficients for luma adaptive loop filtering to create a difference.

24. The apparatus of claim 17, wherein the video coder is further configured to perform Cr chroma adaptive loop filtering for Cr chroma components of the block of pixels and perform Cb chroma adaptive loop filtering for Cb chroma components for the block of pixels.

25. The apparatus of claim 24, wherein the video coder is further configured to:
share filter information of Cr chroma adaptive loop filtering for Cb chroma adaptive loop filtering.

26. The apparatus of claim 25, wherein the filter information includes a CU level on/off map, filter coefficients, and/or block-based classification.

27. The apparatus of claim 26, wherein the CU level on/off map includes values of a CU level on/off flag, wherein a CU level on/off flag with a value of 1 indicates that ALF is performed for the block of pixels, and wherein a CU level on/off flag with a value 0 indicates that ALF is not performed for the block of pixels.

28. The apparatus of claim 24, wherein the video coder is further configured to:
predict the filter coefficients for Cb chroma adaptive loop filtering from the filter coefficients for Cr chroma adaptive loop filtering.

29. The apparatus of claim 17, wherein the video coder is a video encoder, and wherein the video encoder is further configured to:
encode video data to create encoded video data;
reconstruct the encoded video data to create reconstructed video data, wherein the block of pixels is reconstructed video data; and
signal one or more of filter information relating to the luma adaptive filtering and filter information relating to the chroma adaptive loop filtering.

30. The apparatus of claim 17, wherein the video coder is a video decoder, and wherein the video decoder is further configured to:
receive one or more of filter information relating to the luma adaptive filtering and filter information relating to the chroma adaptive loop filtering;
receive encoded video data; and
decode the encoded video data to create decoded video data, wherein the block of pixels is decoded video data.

31. The apparatus of claim 17, wherein the apparatus is a wireless communication device, further comprising:
a receiver configured to receive video data, wherein the video data comprises the block of pixels.

32. The apparatus of claim 31, wherein the wireless communication device is a cellular telephone and the video data is received by the receiver and modulated according to a cellular communication standard.

33. An apparatus configured to perform adaptive loop filtering in a video coding process comprising:
means for determining a status of a coding unit-level luma adaptive loop filtering flag independently from that of a coding unit-level chroma adaptive loop filtering flag;
means for determining whether to perform luma adaptive loop filtering on a block of pixels, based at least in part on the coding unit-level luma adaptive loop filtering flag;
means for determining whether to perform chroma adaptive loop filtering on the block of pixels, based at least in part on the coding unit-level chroma adaptive loop filtering flag, independently of determining whether to perform luma adaptive loop filtering;
means for performing luma adaptive loop filtering for luma components of the block of pixels responsive to determining to perform luma adaptive loop filtering;
means for performing chroma adaptive loop filtering for chroma components of the block of pixels responsive to determining to perform chroma adaptive loop filtering; and
means for deriving filter coefficients for both the luma adaptive loop filtering and chroma adaptive loop filtering based on one of a block-based classification mode and a region-based classification mode.

34. The apparatus of claim 33, wherein the luma and chroma components of the block of pixels are in a 4:2:0, a 4:2:2 or a 4:4:4 format.

35. The apparatus of claim 33, wherein the means for determining to perform chroma adaptive loop filtering includes means for determining the coding unit-level chroma adaptive loop filtering flag.

36. The apparatus of claim 33, further comprising:
means for sharing filter information of luma adaptive loop filtering for chroma adaptive loop filtering.

37. The apparatus of claim 36, wherein the filter information includes a CU level on/off flag, filter coefficients, and/or block-based classification.

38. The apparatus of claim 33, further comprising:
means for predicting the filter coefficients for chroma adaptive loop filtering from the filter coefficients for luma adaptive loop filtering.

39. The apparatus of claim 38, wherein the means for predicting the filter coefficients for chroma adaptive loop filtering includes means for subtracting chroma filter coefficients from the filter coefficients for luma adaptive loop filtering to create a difference.

40. A non-transitory computer-readable storage medium storing instructions that, when executed, causes one or more processors of a device configured to perform adaptive loop filtering in a video coding process to:
determine a status of a coding unit-level luma adaptive loop filtering flag independently from that of a coding unit-level chroma adaptive loop filtering flag;
determine whether to perform luma adaptive loop filtering on a block of pixels, based at least in part on the coding unit-level luma adaptive loop filtering flag;
determine whether to perform chroma adaptive loop filtering on the block of pixels, based at least in part on the coding unit-level chroma adaptive loop filtering flag, independently of determining whether to perform luma adaptive loop filtering;

perform luma adaptive loop filtering for luma components of the block of pixels responsive to determining to perform luma adaptive loop filtering;

perform chroma adaptive loop filtering for chroma components of the block of pixels responsive to determining to perform luma adaptive loop filtering; and derive filter coefficients for both the luma adaptive loop filtering and chroma adaptive loop filtering based on one of a block-based classification mode and a region-based classification mode.

41. The non-transitory computer-readable storage medium of claim 40, wherein the luma and chroma components of the block of pixels are in a 4:2:0, a 4:2:2 or a 4:4:4 format.

42. The non-transitory computer-readable storage medium of claim 40, wherein determining to perform chroma adaptive loop filtering includes determining a value of the coding unit-level chroma adaptive loop filtering flag.

43. The non-transitory computer-readable storage medium of claim 40, the instructions further causing the one or more processor to:

share filter information of luma adaptive loop filtering for chroma adaptive loop filtering.

44. The non-transitory computer-readable storage medium of claim 43, wherein the filter information includes a CU level on/off flag, filter coefficients, and/or block-based classification.

45. The non-transitory computer-readable storage medium of claim 40, the instructions further causing the one or more processor to:

predict the filter coefficients for chroma adaptive loop filtering from the filter coefficients for luma adaptive loop filtering.

46. The non-transitory computer-readable storage medium of claim 45, wherein predicting the filter coefficients for chroma adaptive loop filtering includes subtracting chroma filter coefficients from the filter coefficients for luma adaptive loop filtering to create a difference.

\* \* \* \* \*